US012767041B2

(12) United States Patent
Hosick et al.

(10) Patent No.: US 12,767,041 B2
(45) Date of Patent: Oct. 20, 2026

(54) SEARCHLIGHT SYSTEM FOR VEHICLE POST

(71) Applicant: Golight, Inc., Culbertson, NE (US)

(72) Inventors: Colton D. Hosick, Culbertson, NE (US); Bruce Bair, Culbertson, NE (US); Albert W. Gebhard, Denver, CO (US); Gerald L. Gohl, Culbertson, NE (US)

(73) Assignee: Golight, Inc., Culbertson, NE (US)

( * ) Notice: Subject to any disclaimer, the term of this patent is extended or adjusted under 35 U.S.C. 154(b) by 232 days.

(21) Appl. No.: 18/616,820

(22) Filed: Mar. 26, 2024

(65) Prior Publication Data

US 2024/0308415 A1 Sep. 19, 2024

Related U.S. Application Data

(63) Continuation of application No. 17/099,147, filed on Nov. 16, 2020, now Pat. No. 11,938,859.

(60) Provisional application No. 62/935,734, filed on Nov. 15, 2019.

(51) Int. Cl.

| | |
|---|---|
| ***B60Q 1/24*** | (2006.01) |
| ***B60R 11/00*** | (2006.01) |
| ***B60R 11/04*** | (2006.01) |
| ***F21S 41/19*** | (2018.01) |

(Continued)

(52) U.S. Cl.

CPC .............. *B60Q 1/245* (2013.01); *B60R 11/00* (2013.01); *B60R 11/04* (2013.01); *F21S 41/192* (2018.01); *B60R 2011/004* (2013.01); *B60R 2011/0052* (2013.01); *B60R 2011/0085* (2013.01); *B62D 25/04* (2013.01); *B62D 65/16* (2013.01)

(58) Field of Classification Search

CPC ... B60Q 1/245; F21S 41/192; B60R 2011/004

See application file for complete search history.

(56) References Cited

U.S. PATENT DOCUMENTS

| | | | |
|---|---|---|---|
| 3,307,029 | A | 2/1967 | Gross |
| 4,419,721 | A | 12/1983 | Gregoire |
| 4,890,207 | A | 12/1989 | Jones |

(Continued)

FOREIGN PATENT DOCUMENTS

| | | | |
|---|---|---|---|
| CN | 111022974 | A | 4/2020 |
| WO | 2014172346 | A1 | 10/2014 |

OTHER PUBLICATIONS

Pending U.S. Appl. No. 29/849,560, filed Aug. 11, 2022 (Hosick et al.) by applicant Golight, Inc.

(Continued)

*Primary Examiner* — Nkeisha Smith

(74) *Attorney, Agent, or Firm* — Polson Intellectual Property Law P.C.; Margaret Polson; Christopher Sylvain

(57) ABSTRACT

A searchlight system for mounting to a vehicle, for example on the A-pillar, without requiring modification to structural frame components. The system comprises a mounting assembly which is installed on the vehicle and a searchlight assembly which is mounted to the mounting assembly. Searchlight assemblies with different optical devices can be modularly exchanged with respect to the same mounting assembly installed on the vehicle. Also disclosed is a method for installing such systems. Other aspects are directed to heat dissipation and ingress protection for the searchlight assembly.

22 Claims, 22 Drawing Sheets

(51) Int. Cl.
*B62D 25/04* (2006.01)
*B62D 65/16* (2006.01)

(56) References Cited

U.S. PATENT DOCUMENTS

| | | | | |
|---|---|---|---|---|
| D346,234 | S | 4/1994 | Sammis | |
| 5,386,350 | A | 1/1995 | Gross | |
| 5,490,046 | A | 2/1996 | Gohl | |
| 5,673,989 | A | 10/1997 | Gohl | |
| 6,461,009 | B2 | 10/2002 | Smith | |
| 6,786,622 | B1 | 9/2004 | Rice | |
| 6,789,912 | B2 | 9/2004 | Smith | |
| 6,955,447 | B2 | 10/2005 | Lui | |
| 7,029,057 | B2 | 4/2006 | Izabel | |
| D551,786 | S | 9/2007 | Smith | |
| D573,286 | S | 7/2008 | Zettl | |
| D585,579 | S | 1/2009 | Lehman | |
| D587,832 | S | 3/2009 | Bergmann | |
| 7,733,370 | B2 | 6/2010 | Werth | |
| 7,762,688 | B2 | 7/2010 | Dixon | |
| 7,862,197 | B2 | 1/2011 | Gebhard | |
| 8,113,701 | B2 * | 2/2012 | Ishikawa | B60Q 1/2665 362/509 |
| 8,596,836 | B2 | 12/2013 | Pedersen | |
| 8,708,535 | B2 | 4/2014 | Dalsgaard | |
| 9,255,687 | B2 | 2/2016 | Gebhard | |
| 9,381,870 | B2 | 7/2016 | Jordan | |
| 9,403,492 | B1 | 8/2016 | Greggs | |
| 9,539,952 | B2 | 1/2017 | Gebhard | |
| D806,303 | S | 12/2017 | Matsui | |
| 10,775,029 | B2 | 9/2020 | Sousa | |
| 11,148,610 | B2 * | 10/2021 | Ohsumi | G03B 11/045 |
| 11,168,874 | B2 | 11/2021 | Sousa | |
| 11,225,290 | B2 | 1/2022 | Holyroyd | |
| 11,433,844 | B2 | 9/2022 | Dhruna | |
| 11,453,351 | B1 | 9/2022 | Triplett | |
| D1,017,860 | S | 3/2024 | Harders | |
| 11,938,859 | B2 | 3/2024 | Hosick | |
| 2003/0174508 | A1 * | 9/2003 | Ruckwied | B60Q 1/10 362/523 |
| 2006/0232985 | A1 | 10/2006 | Wang | |
| 2008/0043098 | A1 | 2/2008 | Leblanc | |
| 2013/0058120 | A1 | 3/2013 | Schütz | |
| 2013/0319962 | A1 | 12/2013 | Park | |
| 2019/0275952 | A1 | 9/2019 | Bennett | |
| 2021/0239303 | A1 | 8/2021 | Sousa | |
| 2022/0080892 | A1 | 3/2022 | Whipps | |
| 2023/0144329 | A1 | 5/2023 | Gough | |

OTHER PUBLICATIONS

Pending U.S. Appl. No. 18/586,335, filed Feb. 23, 2024 (Hosick et al.) by applicant Golight, Inc.

Pending U.S. Appl. No. 29/929,765, filed Feb. 23, 2024 (Hosick et al.) by applicant Golight, Inc.

* cited by examiner

FIG. 8
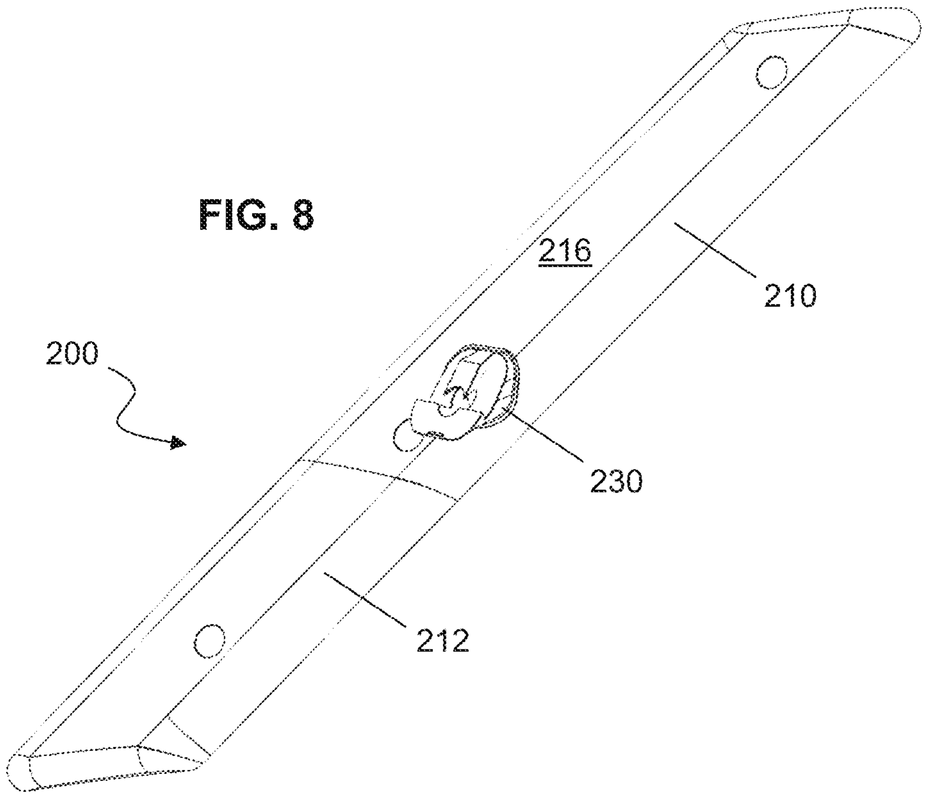
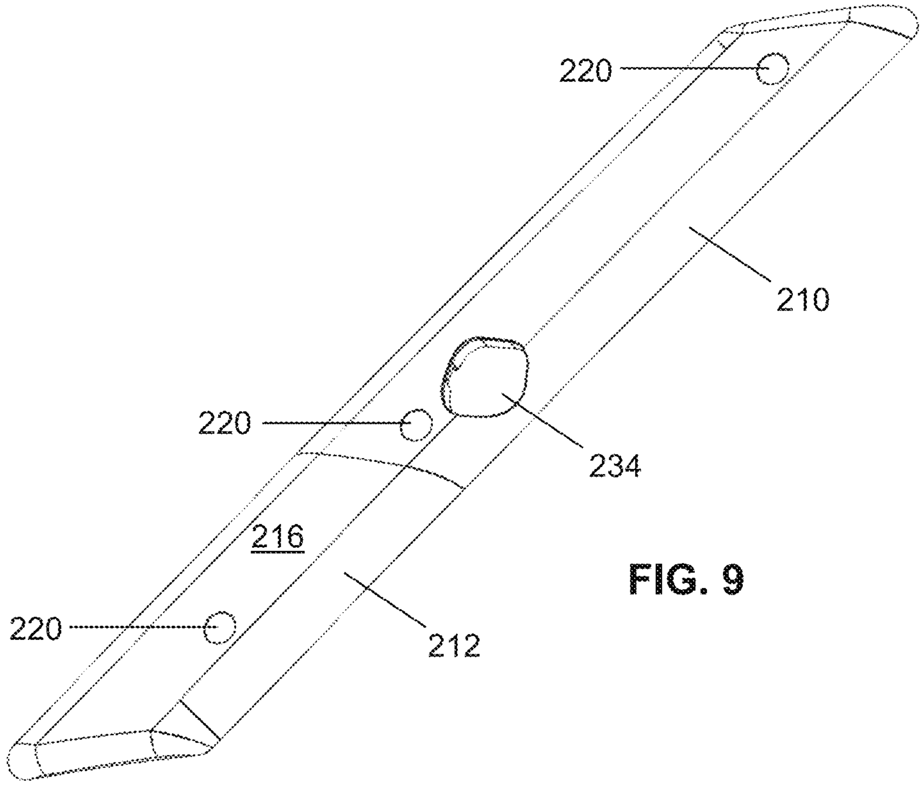
FIG. 9

FIG. 21
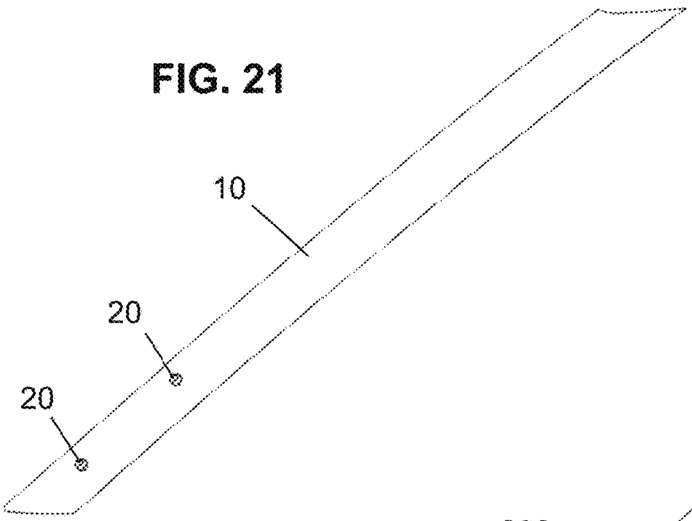
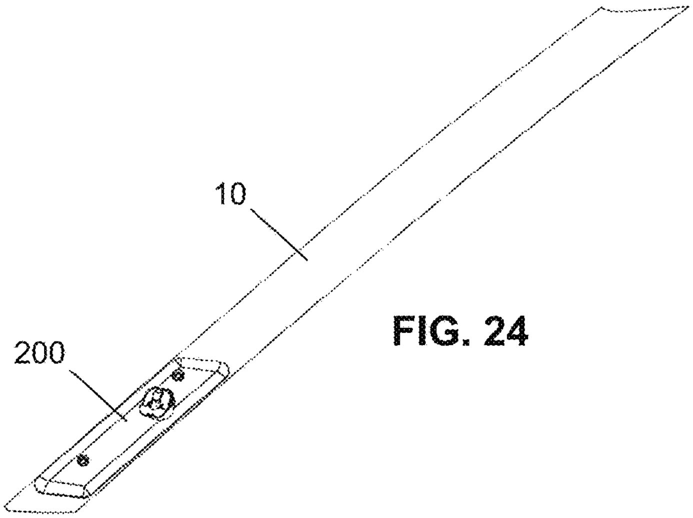
FIG. 24
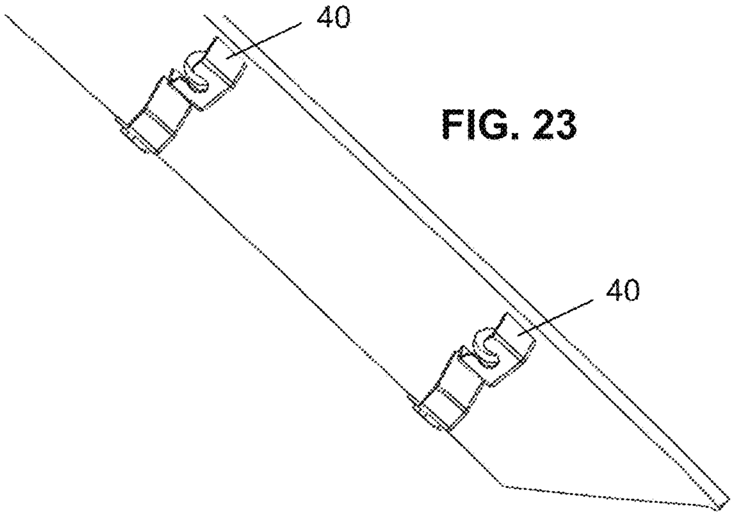
FIG. 23
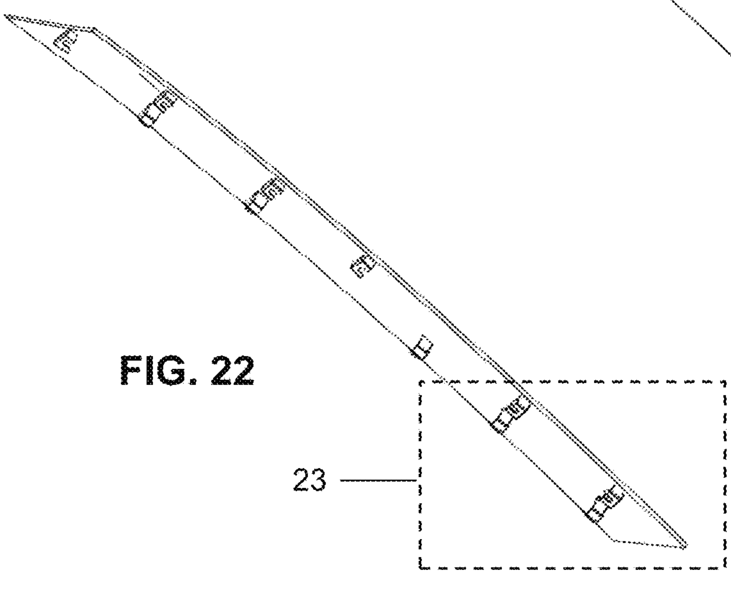
FIG. 22

FIG. 25
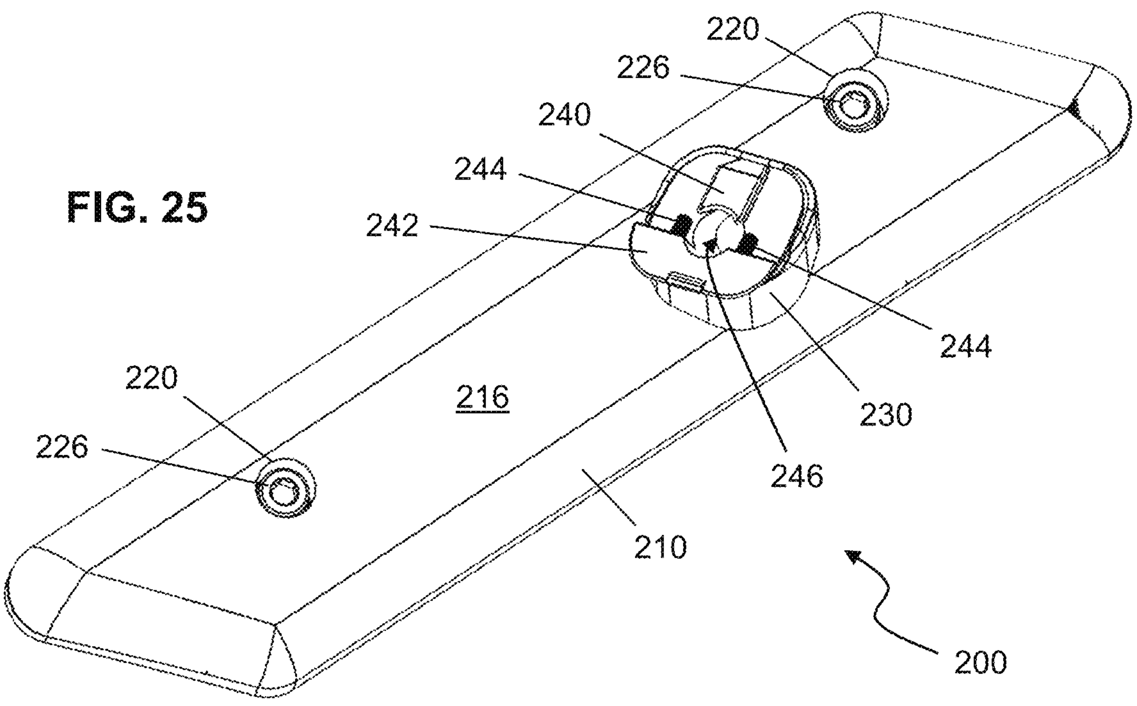
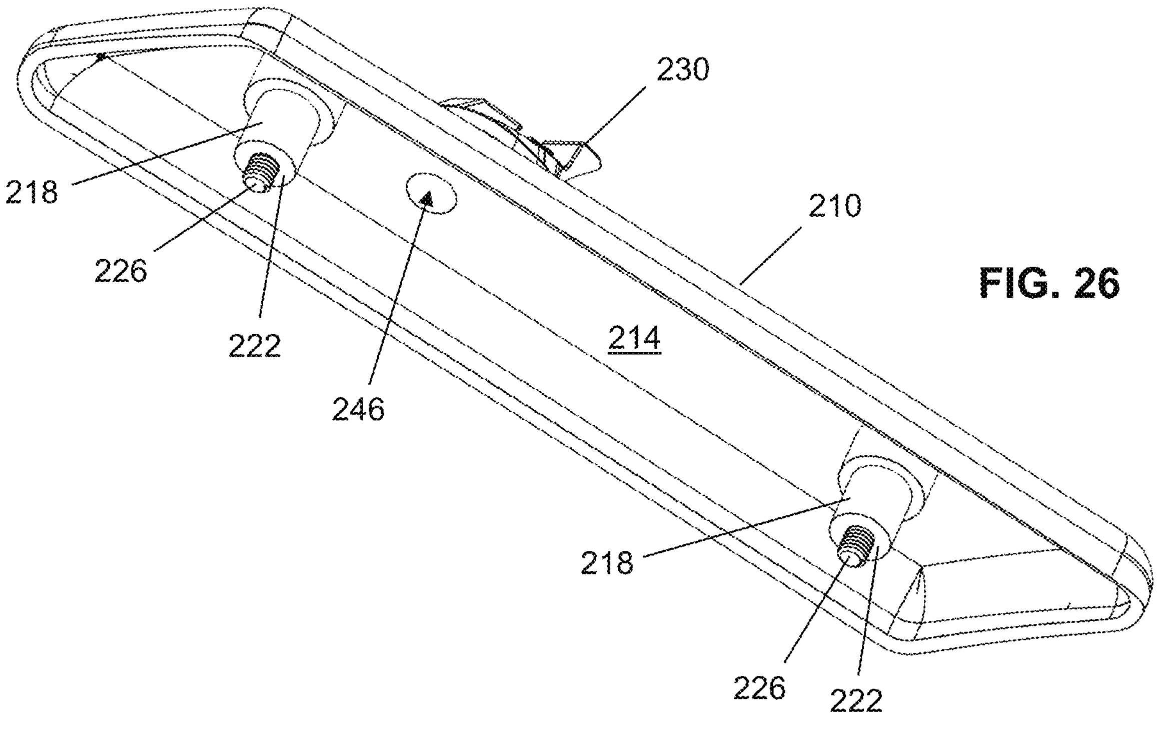
FIG. 26

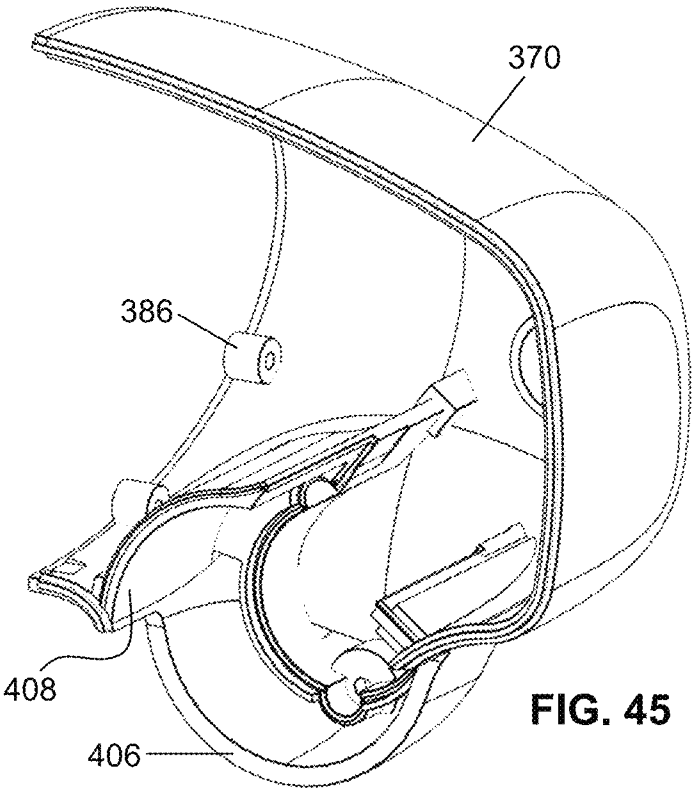
FIG. 45
FIG. 46
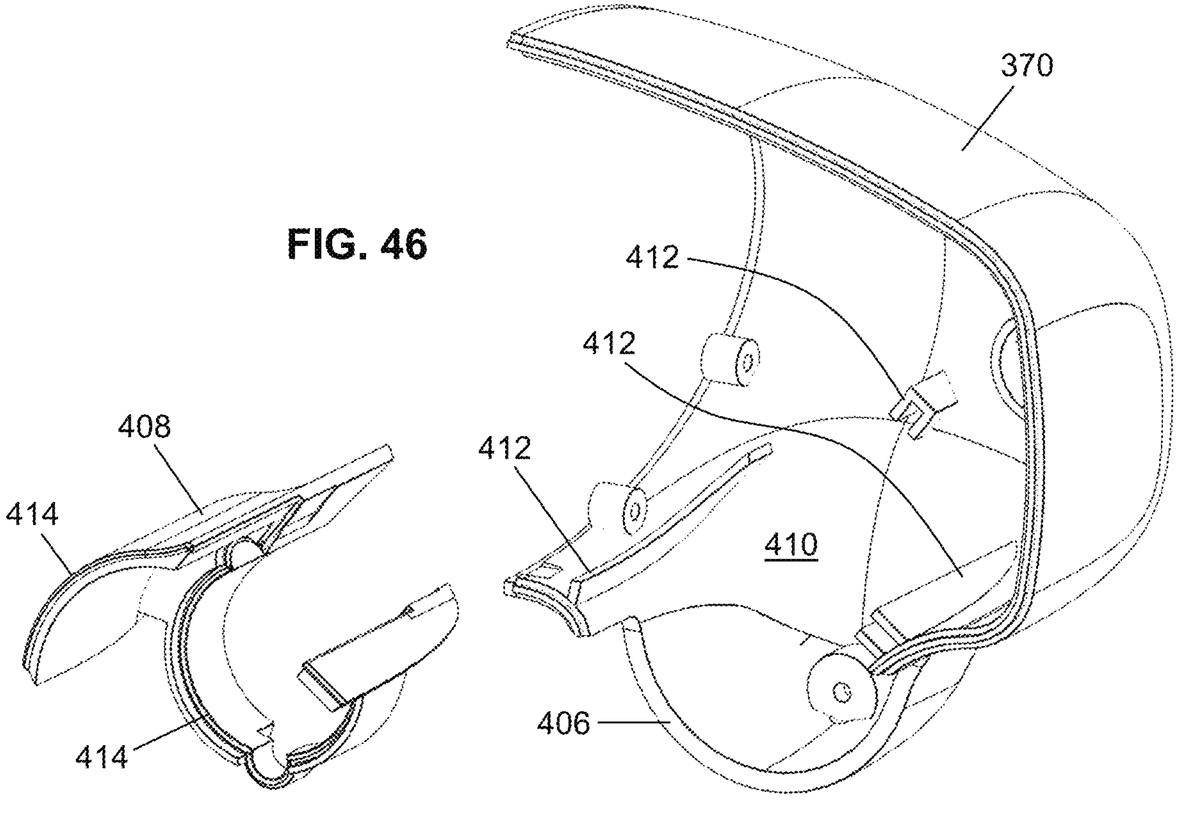

SEARCHLIGHT SYSTEM FOR VEHICLE POST

RELATED APPLICATIONS

This application claims the benefit of application Ser. No. 17/099,147 filed Nov. 16, 2020 and application No. 62/935,734 filed Nov. 15, 2019, which are incorporated-by-reference herein.

BACKGROUND

It can be desirable to mount a spotlight or searchlight to the post or pillar of a vehicle frame. For example, searchlights mounted to the A-pillar of an automobile are commonly used in law enforcement. However, many pillar-mounted searchlight systems are invasive, with installation requiring holes be drilled into and through the pillar of the vehicle body. For example, steering rods of handle-operated spotlights may extend from the interior passenger cabin through the vehicle frame post to the exteriorly-mounted spotlight. Such invasive configurations can potentially weaken the structural integrity of the pillar, which may negatively affect the pillar's crush performance in an impact event such as a rollover and thus present a safety risk. Such structural pillar modifications will also remain in the event that the searchlight system is to be uninstalled and no longer desired, thereby requiring repair in order to restore its pre-modification condition. Additionally, some searchlight mounting systems can involve a tedious process for dismounting and remounting the searchlight, for example during repair or replacement, and may not be readily compatible for use with other types of optical or sensor devices which can be advantageous depending on the user's circumstances.

The foregoing examples of the related art and limitations therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods which are meant to be exemplary and illustrative, not limiting in scope. In various embodiments, one or more of the above described problems have been reduced or eliminated, while other embodiments are directed to other improvements.

The present disclosure relates to a searchlight mounting system, including a mounting assembly and a searchlight assembly, and various aspects thereof, including a method for installing such a system to a vehicle. One aspect provides for the modular exchange of searchlights with respect to a mounting assembly installed on a vehicle. Another aspect provides for a mounting assembly to mount a searchlight to a vehicle without structural modification to the A-pillar. Another aspect provides for a searchlight assembly with improved heat dissipation functionality. Another aspect is directed to ingress protection for a searchlight assembly having a head that is mounted to and rotatable relative to a pivot post.

In one embodiment for the modular exchange of searchlights, a searchlight mounting system comprises a mounting assembly and a searchlight assembly. The mounting assembly includes at least one bracket and an adapter, with the at least one bracket having an interior surface and an exterior surface opposite the interior surface, and the adapter projecting out from the exterior surface of the at least one bracket. The searchlight assembly includes a support arm and a head rotatably mounted with respect to the support arm, with the head carrying an optical or sensor device, and the support arm configured to attach to the adapter. The adapter comprises a first projection and a second projection which are arranged opposite the exterior surface, with a cross-sectional geometry of the first projection becoming wider as the first projection extends away from the adapter. The support arm comprises two corresponding projections at one end. The two projections of the support arm are spaced apart from each other to form a channel therebetween which is shaped to receive the first projection of the adapter. A cross-sectional geometry of this channel becomes narrower as the two projections extend away from the support arm. For example, the cross-sectional geometry of the first projection of the adapter may be trapezoidal in shape, with facing walls of the two projections of the support arm angled inward toward each other in extending away from the support arm to correspond to the trapezoidal shape of the first projection of the adapter. In this way, the first projection of the adapter and the two projections of the support arm may interface to form a dovetail joint. The second projection of the adapter may further comprise two bores configured to receive fasteners, with each bore of the second projection configured to align with a respective fastener mating bore formed in each of the two projections of the support arm. For wired embodiments, the support arm may comprise an internal conduit for which aligns with an internal conduit of the adapter, when the support arm is mounted on the adapter, for running wiring from the searchlight assembly through the adapter. The first projection of the adapter may be positioned vertically higher than the second projection of the adapter when the mounting assembly is mounted to a vehicle, such that the searchlight assembly is downwardly slidable onto adapter of the mounting assembly.

In one embodiment for mounting a searchlight to a vehicle without structural modification to the A-pillar, a mounting assembly comprises at least one bracket and an adapter. The bracket has an interior surface opposite an exterior surface, with the interior surface configured to face toward the vehicle when installed. The adapter projects out from the exterior surface of the bracket and is configured to attach to the searchlight. The bracket comprises projections which extend out from the interior surface, with a first bore formed into each projection from the exterior surface. Each projection has an end wall opposite the interior surface with a second bore formed through the end wall, the first bore being larger in diameter than the second bore. Fasteners having a head and a shank insert into the projections. The head is larger in diameter than the second bore, while the shank is smaller in diameter than the second bore. Openings are formed in a trim cover of the vehicle which covers the A-pillar to receive the projections of the bracket, but otherwise no structural modification of the A-pillar of the vehicle itself is necessary. During installation of the mounting assembly onto the A-pillar, fasteners are inserted into the first bore at the exterior surface of the at least one bracket, through the second bore at the end wall of each projection. The fasteners are anchored into either existing fastener mating holes of the A-pillar or into clip nuts, whereby the fasteners are then tightened against a contact surface provided by the end walls of the projections. The clip nuts, as part of the mounting assembly where the A-pillar does not have fastener mating holes, are positioned underneath the trim cover and receive the shanks of the fasteners. For example, the clips nuts may be mounted onto a metal base piece of the vehicle between the pillar and trim piece, such as in vehicles having such a base piece welded onto the A-pillar for attachment of the trim piece thereon. The at least one bracket may comprise a shell construction with the interior surface defining a cavity for running wiring from the searchlight to the vehicle. For example, the adapter may have an internal conduit for running wiring from the searchlight to the cavity defined by the interior surface of the at least one bracket. The at least one bracket may extend along the A-pillar down to a windshield cowling area of the vehicle. In some embodiments, the adapter is a separate component secured to the bracket. For example, the interior surface of the bracket may comprise an interface surface adjacent a bracket opening therethrough, with the adapter having a mounting collar with a wider geometry than the rest of the adapter and bracket opening, such that the adapter extends through the bracket opening in projecting out from the exterior bracket surface, and the mounting collar of the adapter is coupled to the interface bracket surface. In which case, the mounting collar and/or the interface surface may include a collar conduit for running wiring across the mounting collar. In some embodiments, the at least one bracket comprises an upper bracket and a lower bracket, and the adapter projects out from the exterior surface of the upper bracket. In some embodiments, the at least one bracket and the adapter are formed together as a single component. Such a single-piece construction of the bracket and adapter may or may not have a separate lower bracket depending on the embodiment.

In one embodiment directed to heat exchange, a searchlight assembly comprises a head including at least one housing shell, a heat sink, a heat sink ring gasket, and an optical device. The at least one housing shell houses one or more internal components of the head, and the heat sink is coupled to the at least one housing shell. The heat sink comprises a heat sink ring having a first mating surface, a second mating surface opposite the first mating surface, and an exterior surface extending between the two mating surfaces. The heat sink ring gasket is positioned between the first mating surface and the at least one housing shell to provide a water-resistant seal therebetween. An outer surface of the head is formed, at least in part, by the exterior surface of the heat sink ring and the at least one housing shell. The outer surface of the head is exposed to an outside environment, whereby the heat sink ring is in direct thermal communication with the outside environment. It is preferable that the heat sink be made of a material with high thermal conductivity. For example, the heat sink may be made of aluminum. The at least one housing shell may generally be made of a molded material, such as plastic or aluminum. The heat sink may further comprise a plurality of cooling fins facing the internal components of the head within the at least one shell. A bezel may be provided which abuts the second mating surface of the heat sink ring, and configured to outwardly secure an optical device within the head. The heat sink ring may be coupled to the at least one housing shell via fasteners which extend through the heat sink ring and mate into bosses of the at least one housing. In some embodiments, the fasteners couple the bezel to the second mating surface of the heat sink ring as well.

In another embodiment directed to ingress protection, the searchlight assembly comprises a head and a pivot post. The head includes an optical device, at least one housing shell, and at least one internal housing insert. The pivot post at least partially extends into the head. The head is mounted to the pivot post in a vertically pivotable manner whereby a lower edge of the at least one housing shell is spaced apart from the pivot post for clearance space. The at least one housing shell houses one or more internal components of the head. An internal housing surface of the housing shell comprises insert piece fittings which project from the internal housing surface. The insert piece fittings are shaped to receive and retain the internal housing insert. The internal housing insert is positioned within the insert piece fittings and interfaces with the internal housing surface, whereby the at least one internal housing insert completes a physical partition between the pivot post within the head and the one or more internal components of the head. Both the at least one housing shell and the at least one internal housing insert may be made of a molded material, such as plastic or aluminum. In some embodiments, sealant or adhesive is provided along contact points between the housing shell(s) and the internal housing insert(s). One or more rubber or elastomer seals may also be provided along contact points between the housing shell(s) and the internal housing insert (s). In some embodiments, the head further comprises at least one cradle structure for mounting the one or more internal components of the head, and the at least one internal housing insert interfaces with the at least one cradle structure in completing the physical partition. In which case, sealant or adhesive may be provided along contact points between the cradle structure(s) and the internal housing insert(s) as well. One or more rubber or elastomer seals may also be provided along contact points between the cradle structure(s) and the internal housing insert(s). In some embodiments, the at least one internal housing insert comprises two internal housing inserts, and the two housing inserts interface with each other in completing the physical partition. Again, sealant or adhesive may be provided along contact points between the two housing inserts. Likewise, one or more rubber or elastomer seals may also be provided along contact points between the two housing inserts.

Accordingly, a method for installing a searchlight system to a vehicle may comprise the steps of: forming openings in a trim cover for a pillar of the vehicle; arranging a mounting assembly of the searchlight system on the trim cover, the mounting assembly comprising a mounting bracket having counterbores or countersinks which extend between an exterior surface of the mounting bracket and an interior surface of the mounting bracket, wherein the interior surface faces the trim cover when the mounting bracket is arranged on the trim cover; securing the mounting bracket to the trim cover by tightening fasteners inserted into the counterbores or countersinks from the exterior surface of the mounting bracket, whereby the fasteners are anchored into fastener mating holes of the pillar of the vehicle or into clip nuts underneath the trim cover; and mounting a searchlight assembly to the mounting bracket, wherein an adapter projects from the exterior surface of the mounting bracket, and the searchlight assembly is configured to removably couple to the adapter. The counterbores or countersinks may be formed through projections which project from the interior surface of the mounting bracket, wherein the projections are inserted through the openings of the trim cover when the mounting bracket is arranged on the trim cover. In some embodiments, the mounting bracket comprises a shell construction defining a cavity, and after the step of securing the mounting bracket to the trim cover, wiring is run from the searchlight assembly through the adapter of the mounting bracket and into the cavity which is formed between the trim cover and the interior surface of the mounting bracket. In which case, the wiring may then be run from the cavity between the trim cover and mounting bracket to a windshield cowling area of the vehicle and then through into the interior cabin of the vehicle. In some embodiments, the mounting bracket comprises an upper mounting bracket and a lower mounting bracket, with the upper mounting bracket carrying the adapter, and the upper mounting bracket being secured to the trim cover before the lower mounting bracket is secured to the trim cover. In which case, the lower mounting bracket may be arranged between the upper mounting bracket and the windshield cowling area of the vehicle, and wiring run from the searchlight assembly through the upper bracket and into the interior cabin of the vehicle before the lower mounting bracket is secured to the trim cover. In some embodiments, during the step of mounting the searchlight assembly to the mounting bracket, the adapter of the mounting bracket and the searchlight assembly interface to form a dovetail joint. The searchlight assembly may also be slid downward onto the adapter of the mounting bracket. In some embodiments, fasteners used to secure the mounting bracket to the trim cover may be the original pillar fasteners that came with the vehicle. Where the fasteners are anchored into clip nuts, rather than existing fastener mating holes of the pillar, the clip nuts may be mounted onto a metal piece of the vehicle between the pillar and trim cover, for example, such as in vehicles having such a base piece welded onto the A-pillar for attachment of the trim cover thereon.

The foregoing embodiments and aspects thereof may be practiced independently or combined with any other embodiments and aspects thereof according to the present disclosure. In addition to the aspects and embodiments described above, further aspects and embodiments will become apparent by reference to the accompanying drawings forming a part of this specification.

BRIEF DESCRIPTION OF THE DRAWINGS

The following description is provided on the basis of example embodiments with reference to the appended figures, wherein:

FIG. 8 shows a front perspective view of the mounting assembly of FIG. 3;

FIG. 9 shows the mounting assembly of FIG. 8 without the adapter;

FIG. 21 shows the trim cover of FIG. 20A with openings formed therein;

FIG. 22 shows a rear view of the trim cover of FIG. 21;

FIG. 23 shows a detail view of box 23 of FIG. 22;

FIG. 24 shows the trim cover of FIG. 21 with another embodiment of the mounting assembly;

FIG. 25 shows a front perspective view of the mounting assembly of FIG. 24;

FIG. 26 shows a bottom perspective view of the mounting assembly of FIG. 25;

FIG. 45 shows a left side perspective view of a right housing shell with insert piece installed;

FIG. 46 shows the right housing shell and insert piece of FIG. 45 with the insert piece moved off to the left.

Before explaining the selected embodiments, it is to be understood that the present disclosure is not limited in application to the details of the particular arrangements shown and is capable of other embodiments. While certain embodiments are illustrated in reference to the figures, it is intended that the embodiments and figures disclosed herein are to be considered illustrative rather than limiting. Also, the terminology used herein is for the purpose of description and not of limitation.

DETAILED DESCRIPTION

As used herein, the terms "front", "forward" and the like refer generally to the normal direction of travel of an automobile having a searchlight system according to the present disclosure, while the terms "rear", "back" and the like refer generally to the opposite or reverse direction.

Figure 1A:
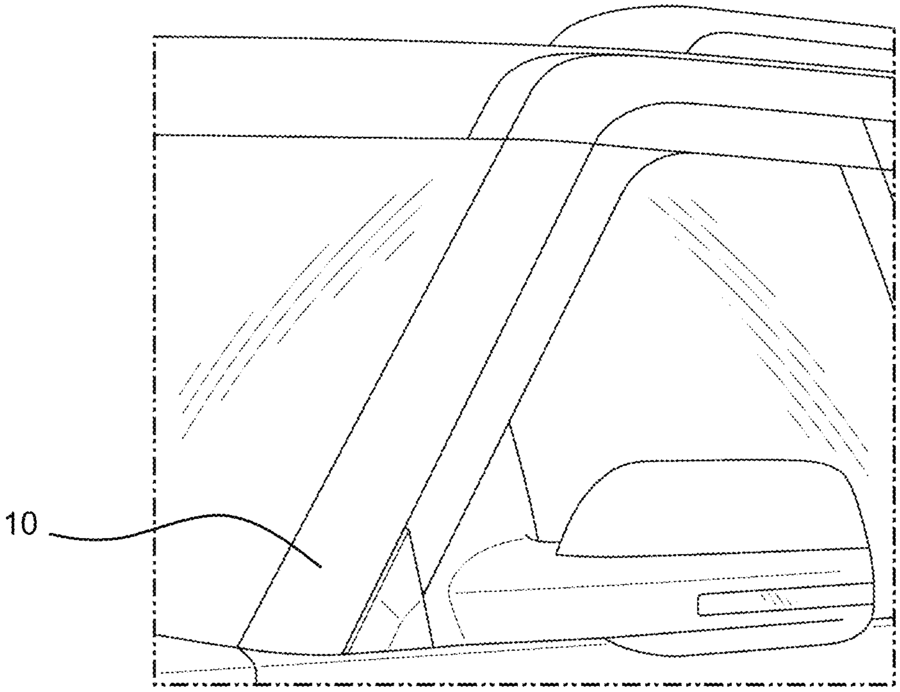
FIG. 1A shows a front perspective view of a vehicle's left A-pillar with trim cover.
Figure 1B:
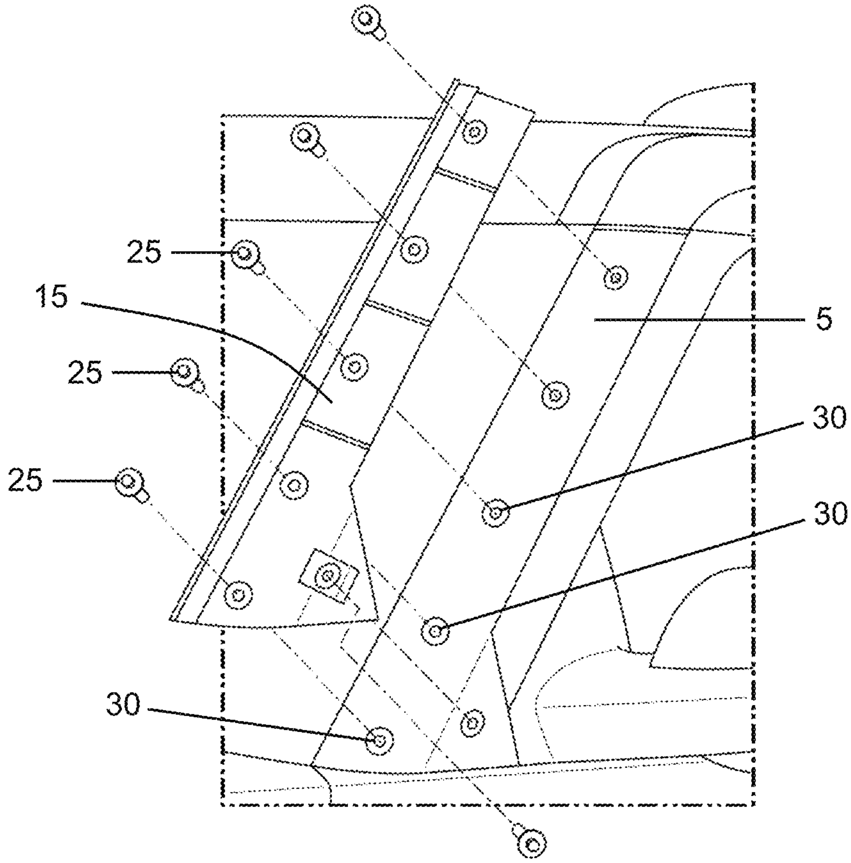
FIG. 1B shows the vehicle A-pillar of FIG. 1A without the trim cover, with underlying components in exploded view.

FIG. 1A shows the left A-pillar of an automobile with a trim cover 10. These types of covers are also generally referred to as windshield, pillar or side trim pieces or moldings. The automobile in the depicted embodiment is a 2012-2019 Ford Explorer. The cover 10 snaps onto and covers a base trim piece 15 which is secured via fasteners 25 (e.g. bolts) to the A-pillar of the automobile frame (see FIG. 1B). The A-pillar 5 in this type of construction includes threaded mating holes 30 for receiving the fasteners 25 which secure the base piece 15 thereto. When these components are assembled, the cover 10 gives a finished aesthetic appearance to the automobile exterior.

Figure 2:
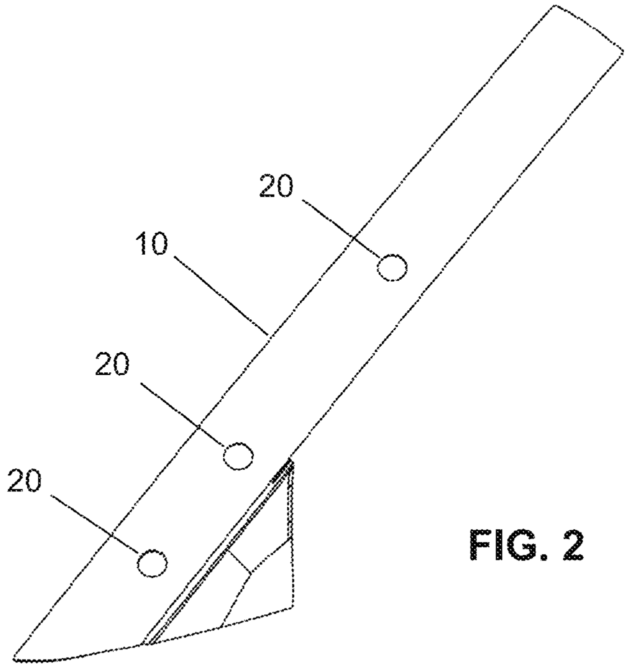
FIG. 2 shows the trim cover of FIG. 1A with openings formed therein.
Figure 3:
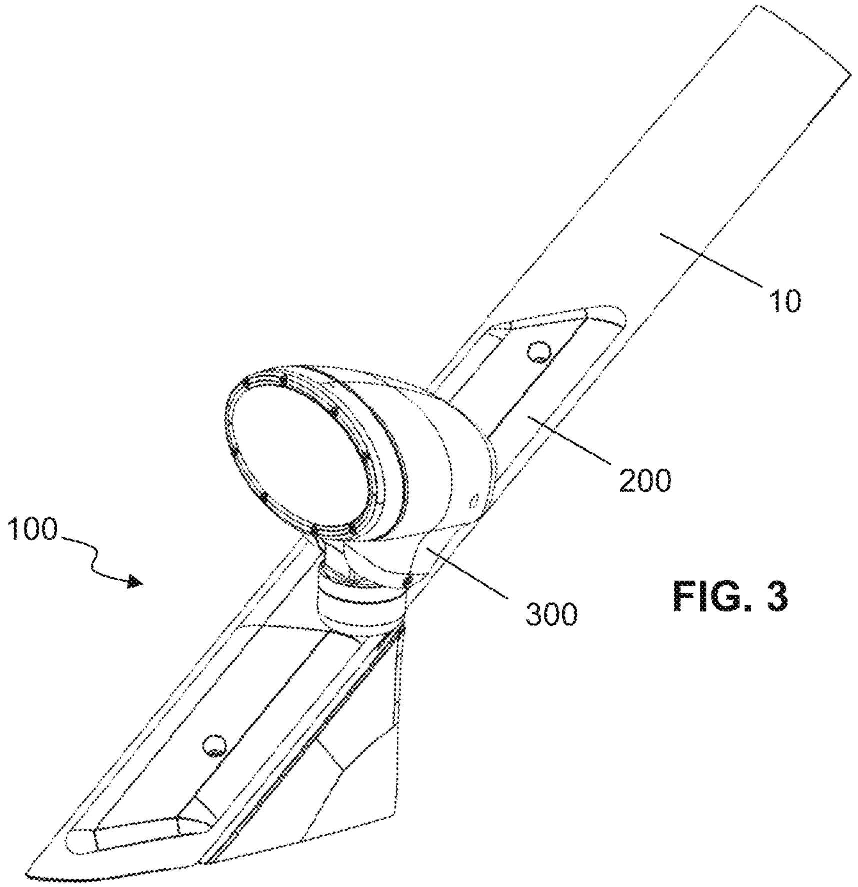
FIG. 3 shows a front perspective view of a searchlight system mounted on the trim cover of FIG. 2.
Figure 4:
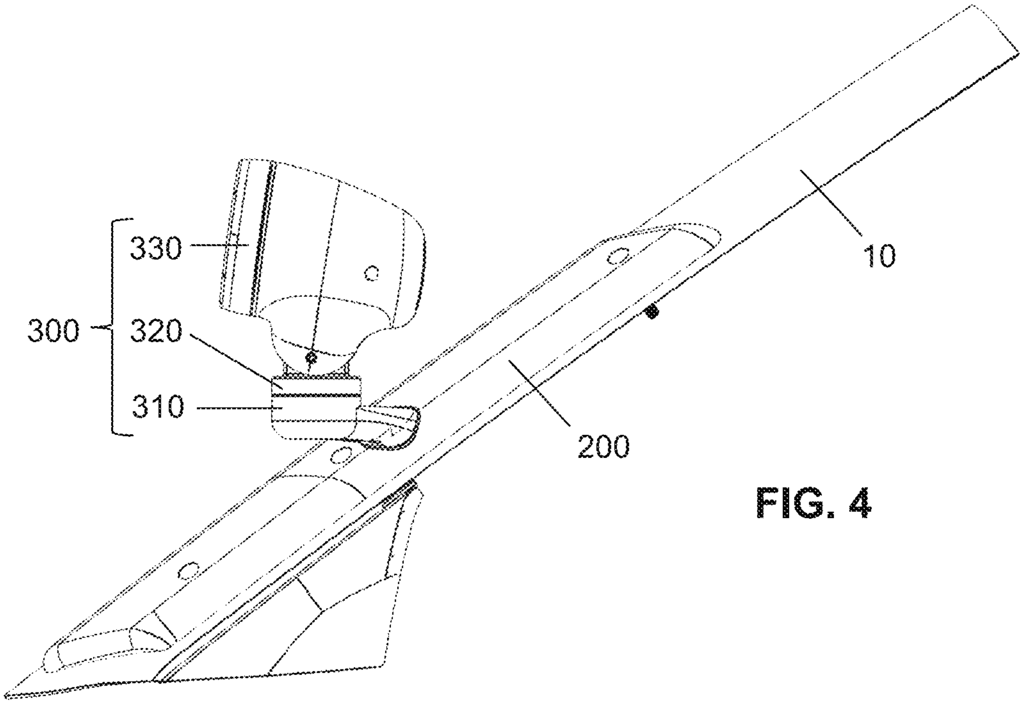
FIG. 4 shows a left side view of the searchlight system and trim cover of FIG. 3.
Figure 5:
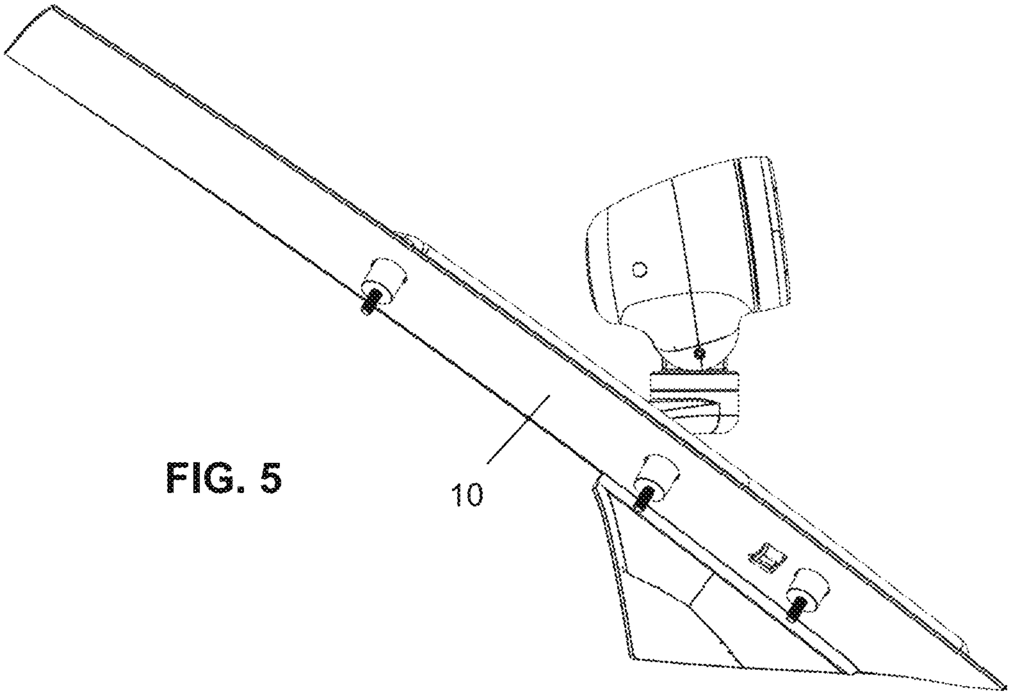
FIG. 5 shows a right side view of the searchlight system and trim cover of FIG. 4.
Figure 6:
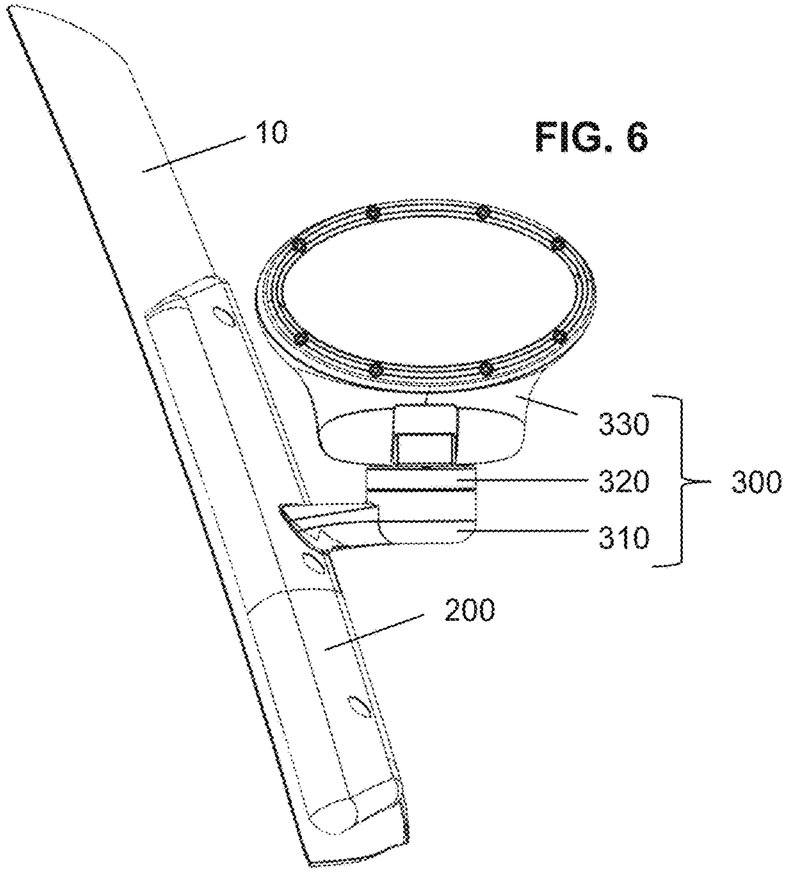
FIG. 6 shows a front side view of the searchlight system and trim cover of FIG. 3.
Figure 7:
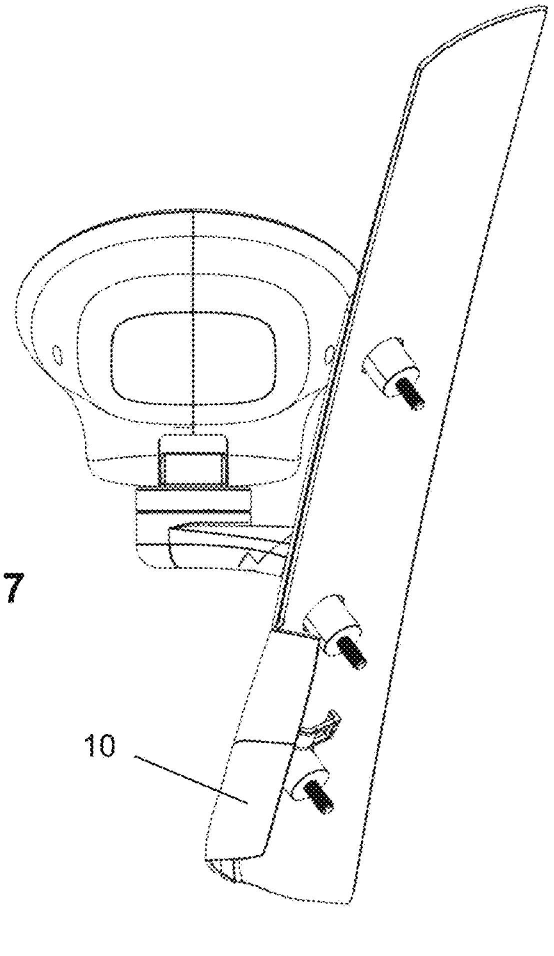
FIG. 7 shows a back side view of the searchlight system and trim cover of FIG. 6.
Figure 10:
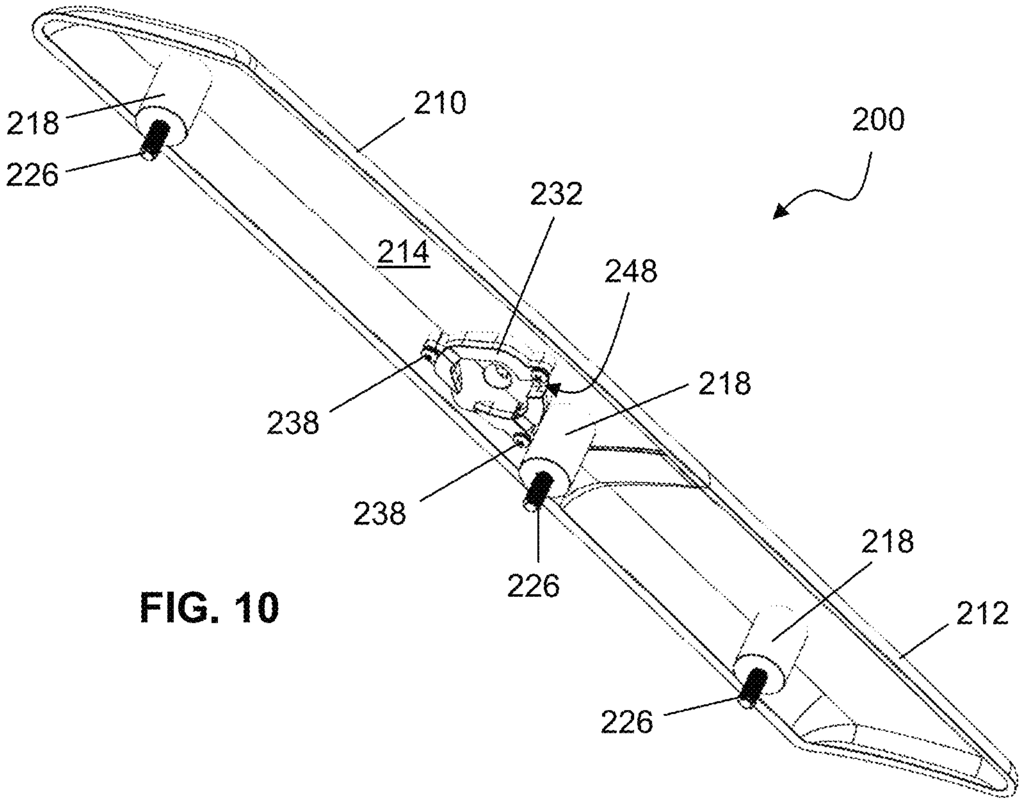
FIG. 10 shows a bottom perspective view of the mounting assembly of FIG. 8.
Figure 11:
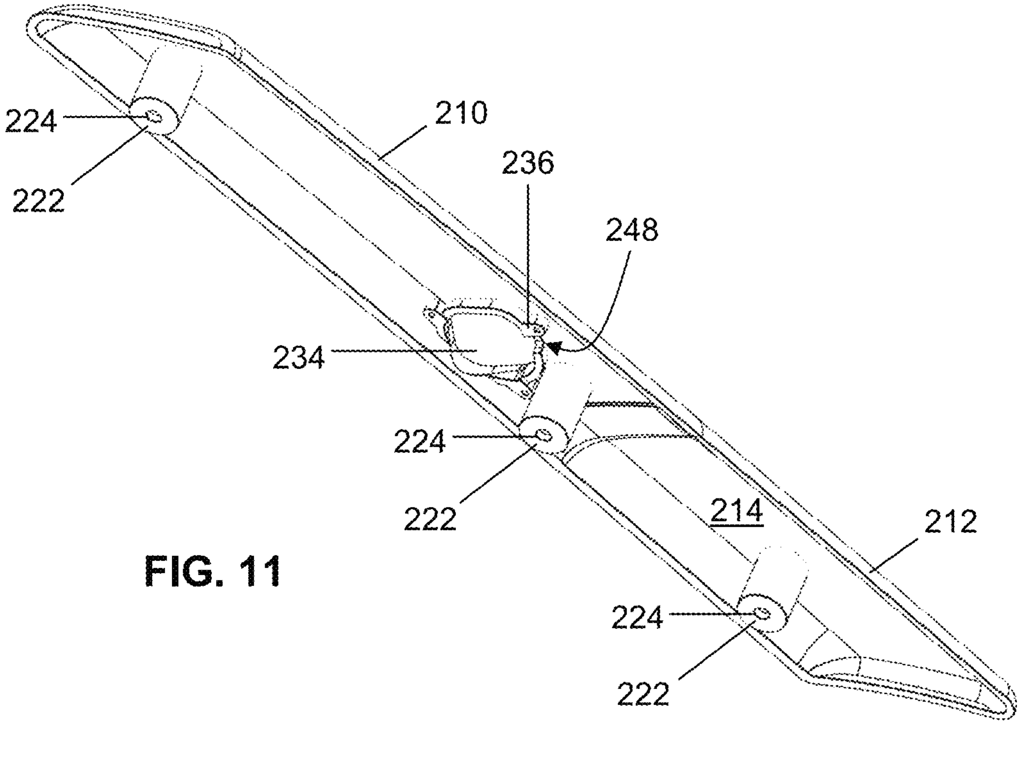
FIG. 11 shows the mounting assembly of FIG. 10 without the adapter and fasteners.
Figure 12:
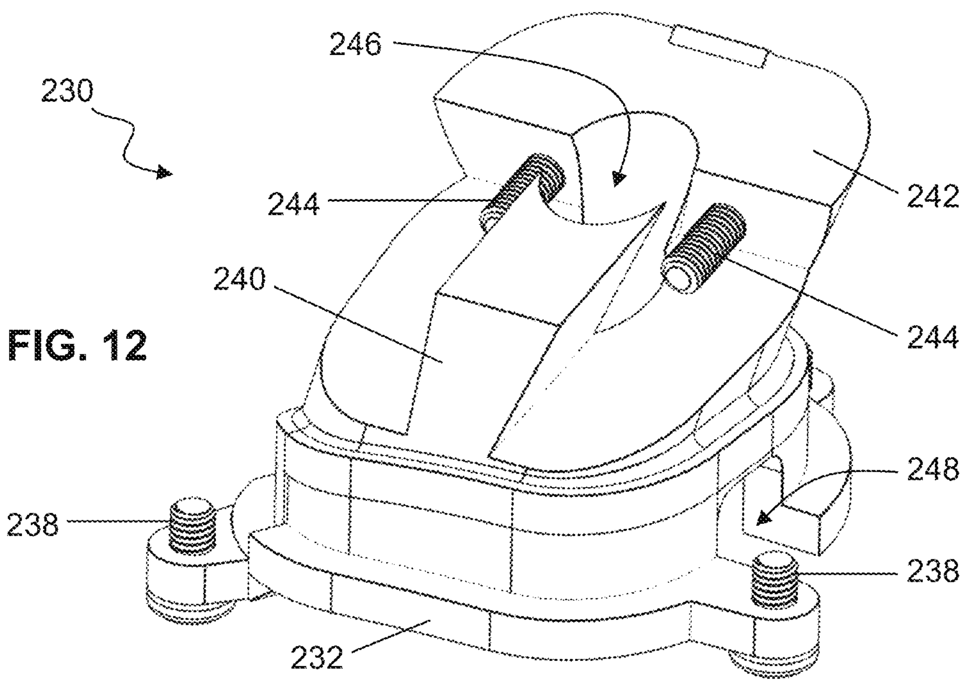
FIG. 12 shows a top rear perspective view of the adapter of FIG. 8 without the brackets.
Figure 13:
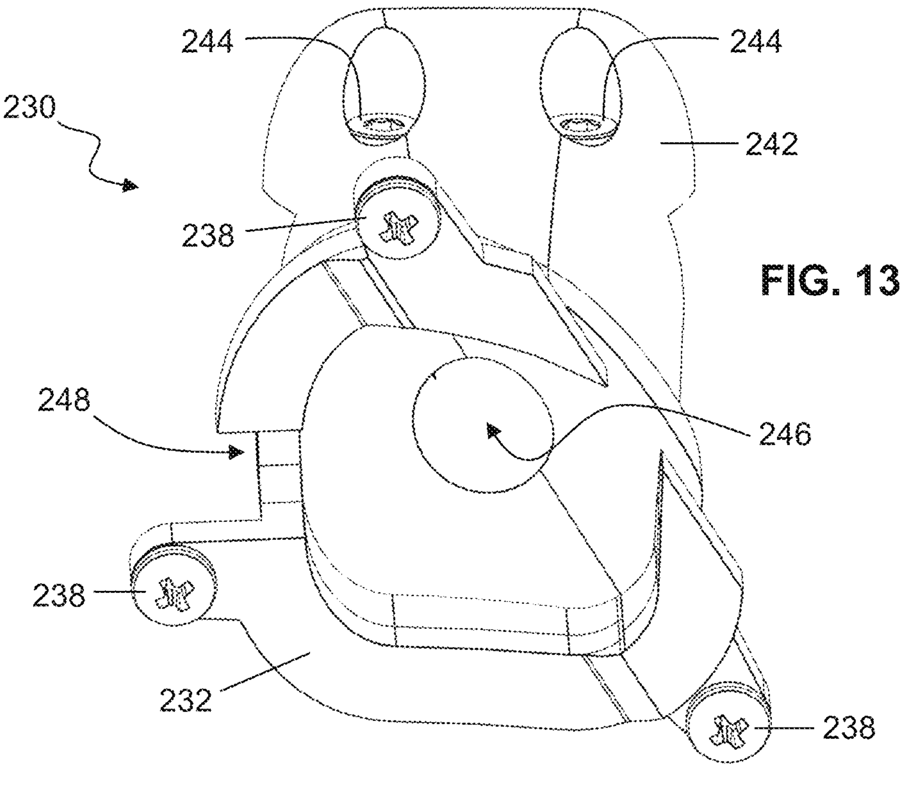
FIG. 13 shows a bottom front perspective view of the adapter of FIG. 12.
Figure 14:
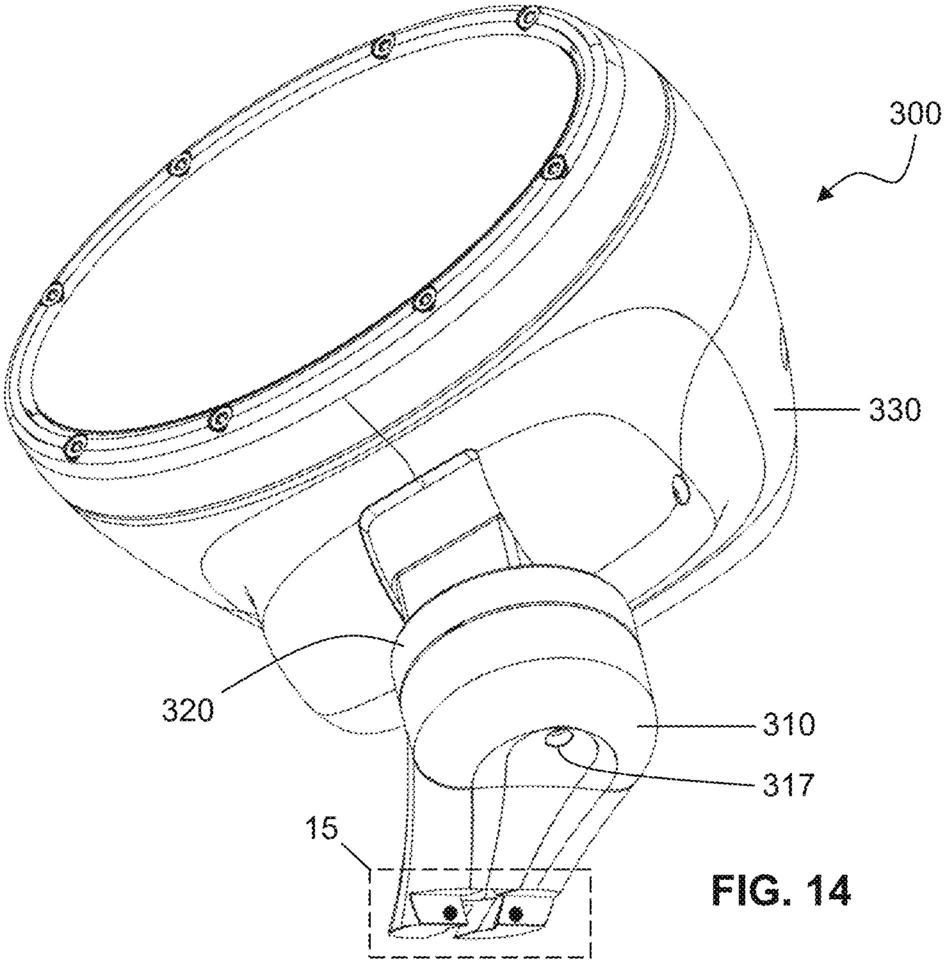
FIG. 14 shows a bottom front perspective view of the searchlight assembly of FIG. 3.
Figure 15:
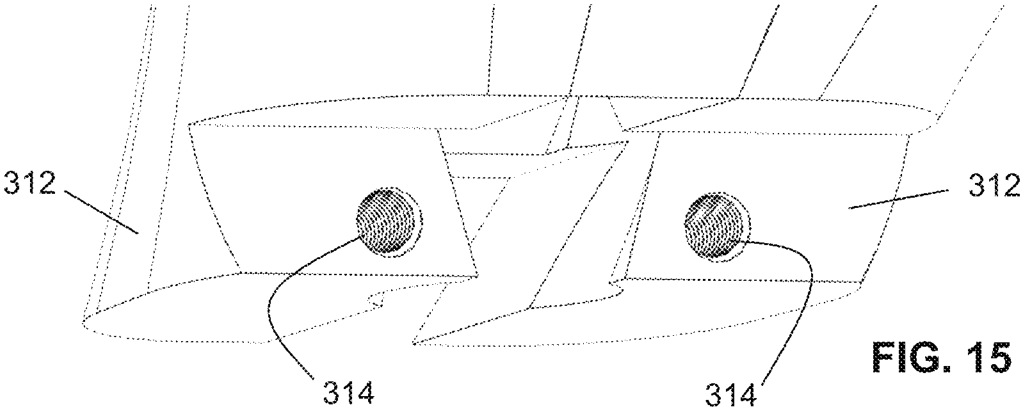
FIG. 15 shows a detail view of box 15 of FIG. 14.
Figure 16:
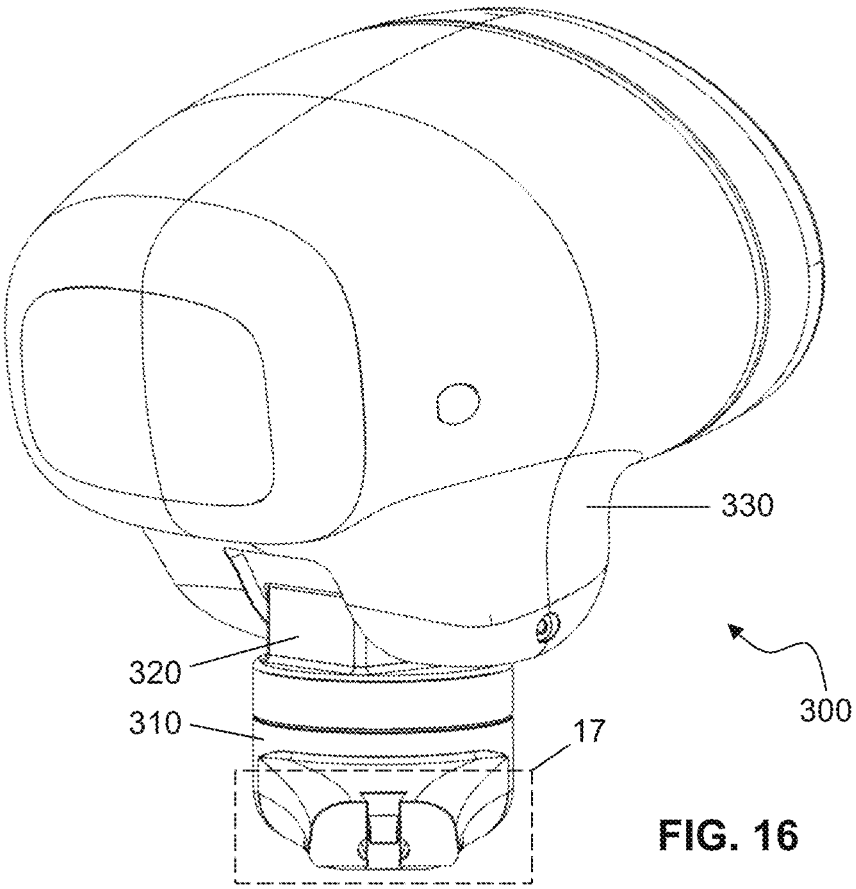
FIG. 16 shows a back side perspective view of the searchlight assembly of FIG. 14.
Figure 17:
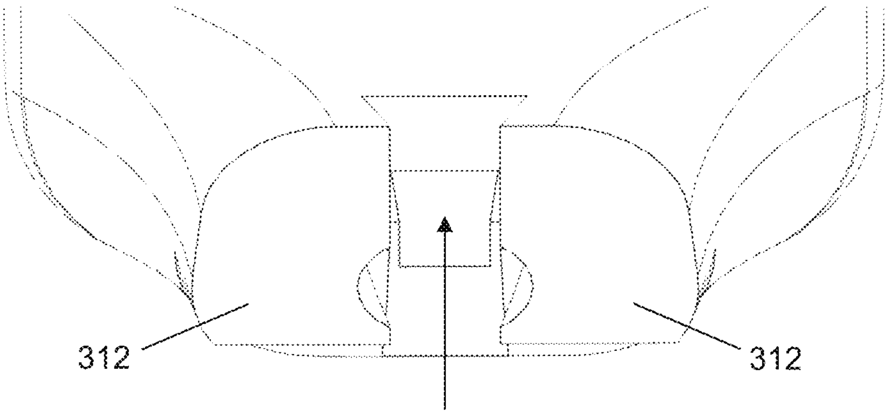
FIG. 17 shows a detail view of box 17 of FIG. 16.
Figure 18:
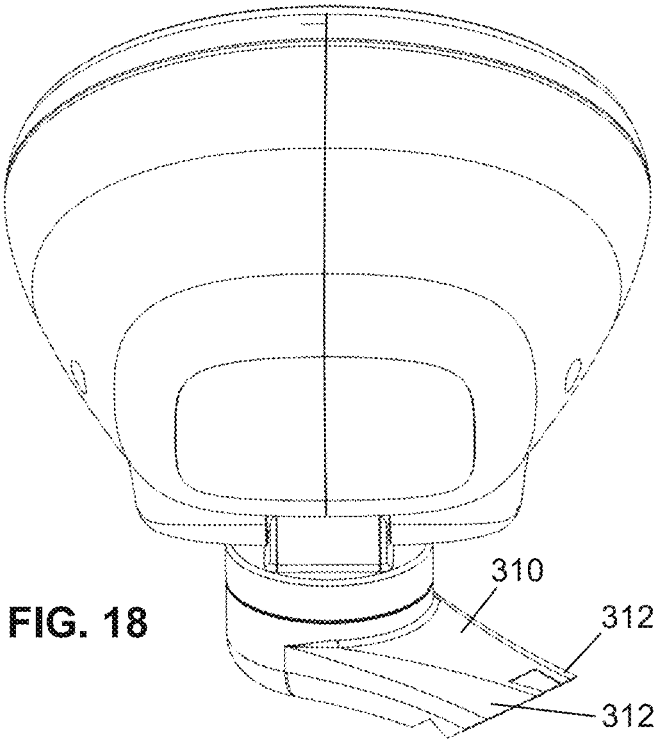
FIG. 18 shows a back perspective view of the searchlight assembly of FIG. 14.
Figure 19:
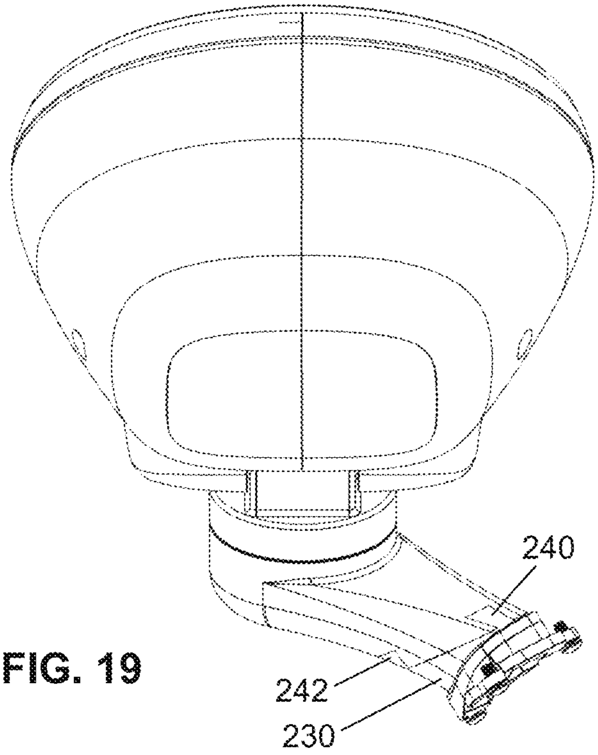
FIG. 19 shows the searchlight assembly of FIG. 18 connected to the adapter of the mounting assembly.

FIG. 2 shows the trim cover 10 of FIG. 1A with openings 20 introduced for installing a searchlight system according to the present disclosure. As discussed in more detail below, the openings 20 in the cover 10 are aligned with the fastener holes 30 in the A-pillar 5. It should be appreciated that the specific location and arrangement of the openings 20 may be different depending on the automobile model.

FIGS. 3-7 show a searchlight system 100 mounted on the trim cover 10. The system 100 comprises a mounting assembly 200 and a searchlight assembly 300. As discussed in more detail below, the searchlight assembly 300 comprises a support arm 310, a pivot post 320, and a head 330.

Referring also now to FIGS. 8-13, the mounting assembly 200 comprises one or more brackets 210, 212 and an adapter 230. Each bracket 210, 212 has an interior surface 214, which faces in the direction of the automobile frame when installed, and an exterior surface 216, which faces away from the automobile when installed. Each bracket 210, 212 has a shell construction which forms a cavity bounded by the interior surface 214. This cavity provides clearance space between the brackets 210, 212 and the cover 10 for running wiring (not shown).

The brackets 210, 212 have projections 218 extending out from the interior surface 214. The projections 218 are inserted into the openings 20 of the cover 10 during installation. A bore 220 is formed into each projection 218 from the exterior surface 216 of the brackets 210, 212. The diameter of the bore 220 is sized to allow passage of the head of the fastener 226. Each projection 218 has an end wall 222 on its side opposite the interior surface 214. The end wall 222 has a bore 224 sized to allow passage of the shank of the fastener 226, but not the head of the faster 226, and therefore provides a contact surface for tightening the fastener 226. Therefore, bore 224 is smaller in diameter than bore 220 and together they form a counterbore (or countersink) within the projection 218. In this way, the fastener 226 may be inserted into the bore 220 at the exterior surface 216, then through the bore 224 of the end wall 222 of each projection 218—which extend through the openings 20 of the trim piece 10—into the fastener receiving hole 30 of the A-pillar 5, and then tightened against the contact surface provided by the end wall 222 to securely couple the brackets 210, 212 to the A-pillar 5 and trim pieces 10, 15.

It should be appreciated that the length of the projection 218 from the interior surface 214 (in conjunction with the depth of the cavity formed by the shell construction of the brackets 210, 212) determines how close the fastener contact surface of the end wall 222 is positioned relative to the fastener receiving hole 30 of the A-pillar 5. In embodiments where the original A-pillar fasteners are to be reused in installing the mounting assembly 200 (i.e. fasteners 25 are fasteners 226), the length of each projection 218 should permit a secure connection whereby the fastener 226 sufficiently extends into the fastener receiving hole of the A-pillar. In other embodiments, for example if longer replacement fasteners are to be used as fasteners 226 in installing the mounting assembly 200, the length of the projections 218 may be reduced or the projections 218 omitted altogether (in which case the exterior surfaces 216 of the brackets may provide the fastener contact surface and the size of the openings 220 reduced to allow passage of the fastener shank, but not the fastener head).

The depicted embodiment includes separate upper and lower brackets 210, 212. With this configuration, the upper bracket 210 may be mounted first, and any wiring of the searchlight assembly 300 may then be run before the lower bracket 212 is installed. The wiring can be run down into the windshield cowling area and through the firewall (which typically has apertures) separating the engine compartment from the passenger compartment. In this way, the searchlight assembly 300 may be controlled by a user within the passenger cabin. The lower bracket 212 largely serves a cosmetic/protective function in covering the wiring, rather than a structural function in supporting the searchlight assembly 300. It should be appreciated that other embodiments may instead include only one bracket or more than two brackets, which additionally may differ in extent along the A-pillar.

In the depicted embodiment, the adapter 230 is provided as a separate component from the brackets 210, 212. The adapter 230 comprises a mounting collar 232 which has a wider geometry than the remainder of the adapter 230. In this way the adapter 230 may be inserted through an opening 234 of the bracket 210, whereby the mounting collar 232 contacts a corresponding interface surface 236 provided on the interior surface 214 of the bracket 210 and is coupled to the bracket 210 via fasteners 238. This approach may be advantageous for fabrication purposes given the relatively complicated structure of the adapter 230 in the depicted embodiment. However, it should be appreciated that the adapter 230 and the bracket 210, or brackets 210, 212, may instead be produced as a single-piece in other embodiments. Further, the specific design of the mounting collar 232 and interface surface 236, including the number and position of fasteners 238, may be modified and therefore different from the depicted configuration in other embodiments.

When coupled to bracket 210, the adapter 230 projects outward from the exterior surface 216 of the bracket 210 and provides a structure for connecting the searchlight assembly 300 to the mounting assembly 200. On its free side opposite the bracket 210, the adapter 230 comprises a first projection 240 and a second projection 242. In the depicted embodiment, the projection 240 has a trapezoidal shaped cross section, wherein the base of the projection 240 becomes wider as the projection 240 extends away from adapter 230, although other geometries may also be used (e.g. a bulb shaped cross section). The second projection 242 includes two bores configured to receive fasteners 244 in the direction of the first projection 240. The fasteners 244 are arranged on each side of an internal conduit 246 of the adapter 230. The internal conduit 246 provides a passage for running wiring from the interior of the searchlight assembly 300 through to the internal-facing side of the mounting assembly 200. The adapter mounting collar 232 and/or interface surface 236 may also include a conduit 248 for this purpose.

As seen in FIGS. 14-19, the side of the support arm 310 of the searchlight assembly 300 which interfaces with the adapter 230 of the mounting assembly 200 comprises projections 312. The projections 312 are spaced apart from one another. The space between the projections 312 is configured to receive the projection 240. Thus, the space between the projections 312 forms a channel having a cross section corresponding to the shape of the adapter projection 240, wherein the width of this channel becomes narrower as the projections 312 extend away from the support arm 310. In the depicted embodiment, the facing walls of the projections 312 are angled inward to match the trapezoidal shape of the first adapter projection 240. Each of the support arm projections 312 may further comprise a threaded fastener mating bore 314. As seen here, the support arm 310 also has an internal conduit 316 which provides a passage for running wiring. When the searchlight assembly 300 is installed on the mounting assembly 200 (described below), the conduits 246, 316 are aligned to form a single passage therebetween enclosed by the adapter/support arm projections 240, 242, 312. In other embodiments, wiring from the searchlight assembly 300 may be run directly outside, such as through aperture 317 formed on the bottom side of the support arm 310 (see FIG. 14), rather than internally through the mounting assembly 200, preferably with a protective covering to prevent damage to such exterior wiring extending between the searchlight assembly 300 and the vehicle ingress point.

In attaching the searchlight assembly 300 to the mounting assembly 200, the searchlight assembly 300 is slid onto to the mounting assembly 200, whereby the first projection 240 of the adapter 230 is moved into the space between the projections 312 of the support arm 310 until the second projection 242 of the adapter 230 abuts the projections 312. In this way, a dovetail joint is formed between the adapter projection 240 and arm projections 312. It is preferable if the first adapter projection 240 is arranged above the second adapter projection 242 when the mounting assembly 200 is installed on an automobile. In this case, the searchlight assembly 300 is slid downward onto the adapter 230 until the arm projections 312 are supported against gravity by the second adapter projection 242, which provides a strong attachment in combination with the dovetail mating between the first adapter projection 240 and arm projections 312. Once the supporting arm 310 is positioned on the adapter 230, the fasteners 244 may be inserted through the second adapter projection 242 into the threaded fastener mating bores 314 of the arm projections 312, and then tightened against the contact surface provided by the second adapter projection 242 to further secure the attachment between the searchlight assembly 300 and the mounting assembly 200. Wiring for the searchlight assembly 300 may be run through the mounting assembly 200 before mounting, and pulled taut as the support arm 310 is slid onto the adapter 230 to avoid wire damage during installation.

With this attachment, the searchlight assembly 300 may be readily exchanged with respect to the mounting assembly 200 in a modular manner. For example, it may be desirable to uninstall a particular searchlight assembly for repair or to replace it with another searchlight assembly fitted with a different type of optical or sensor system (e.g. light emitting diodes (LEDs), halogen lamps, high-intensity discharge (HID) lamps, cameras, infrared devices, heat sensitive devices, etc.). The mounting assembly 200 can remain installed on the automobile, ready for use with any searchlight assembly 300 configured to mate with the adapter 230. Therefore, such a modular system 100 may realize substantial benefits in terms searchlight interchangeability and installation time/effort.

Figure 20A:
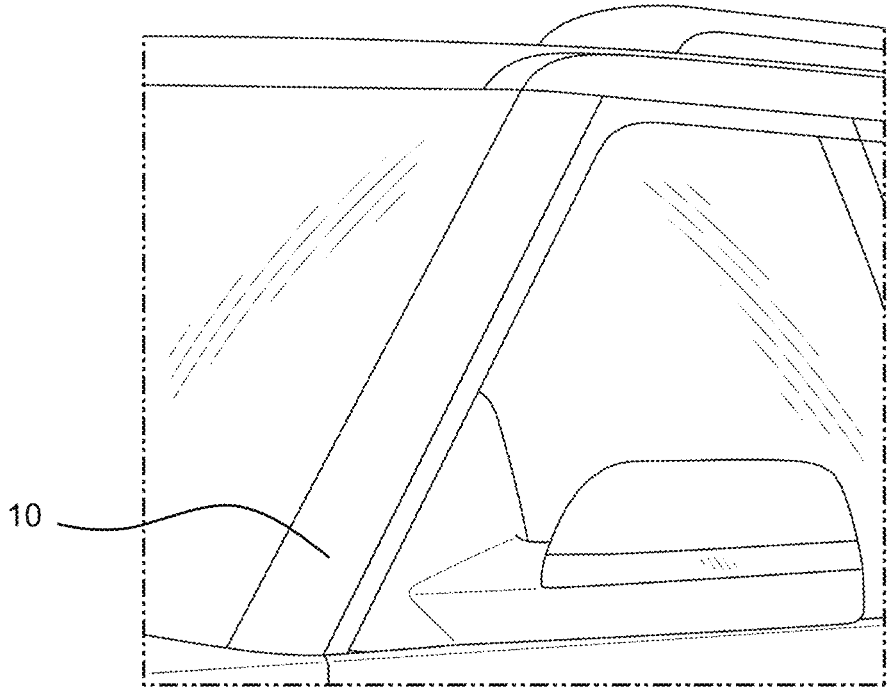
FIG. 20A shows a front perspective view of another vehicle's left A-pillar with trim cover.
Figure 20B:
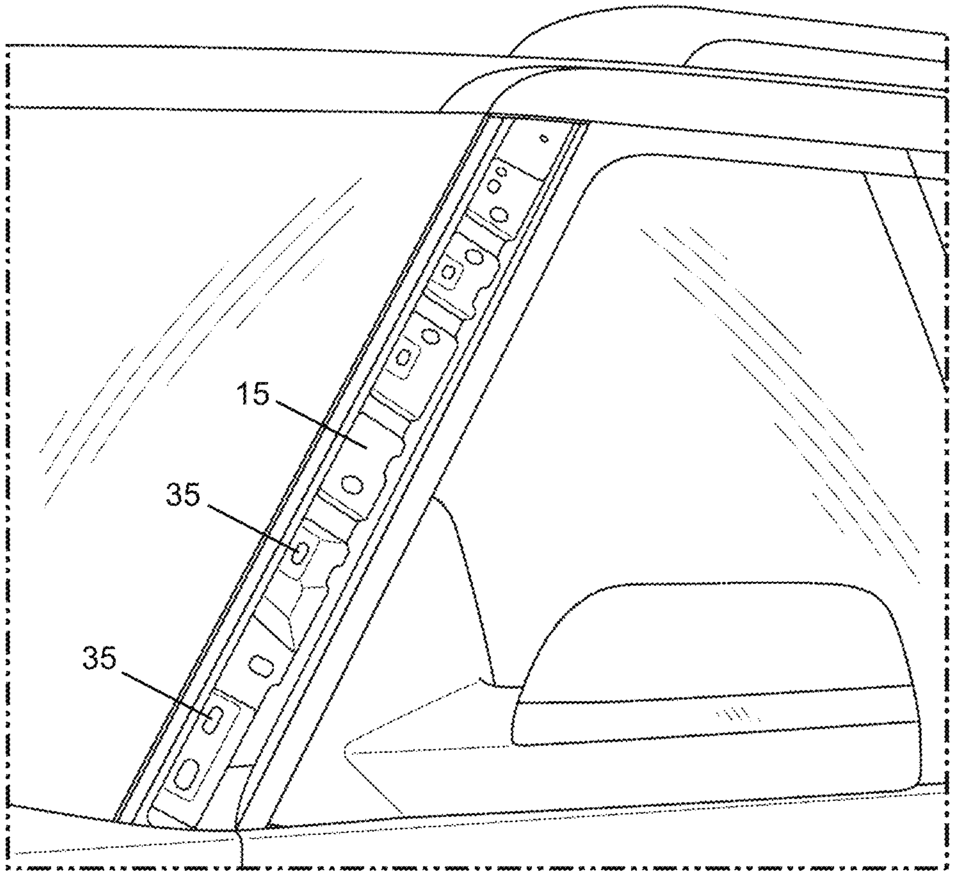
FIG. 20B shows the vehicle A-pillar of FIG. 20A without the trim cover.
Figure 27:
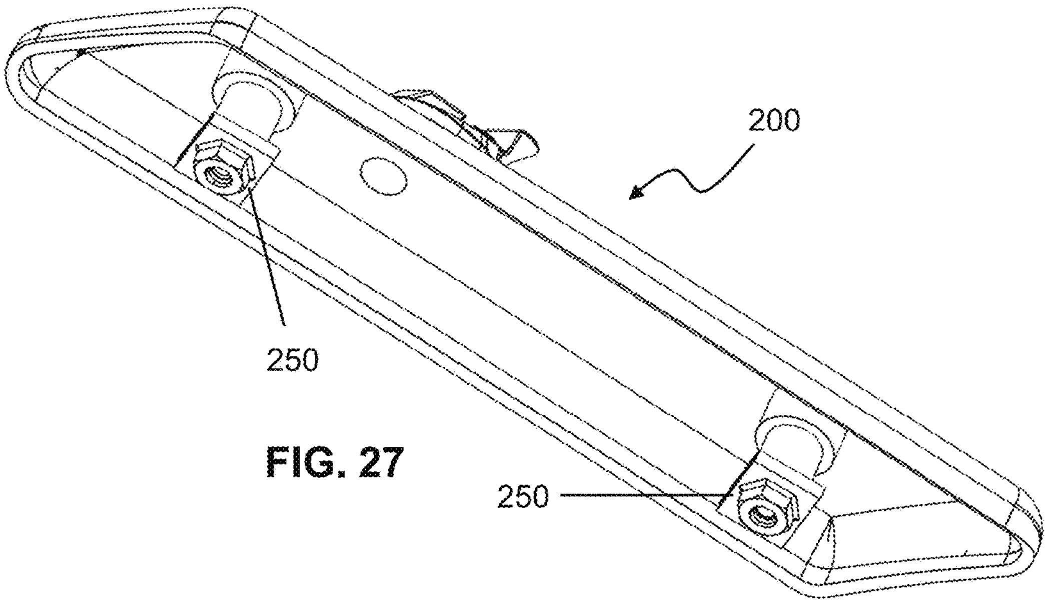
FIG. 27 shows the mounting assembly of FIG. 26 with clip nuts.
Figure 28:
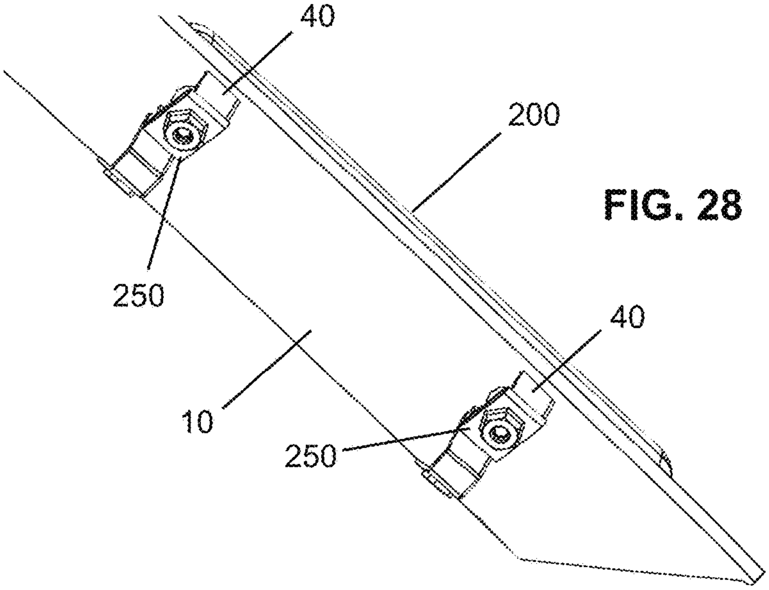
FIG. 28 shows the detail view of FIG. 23 with the mounting assembly and clip nuts installed on the trim cover.
Figure 29:
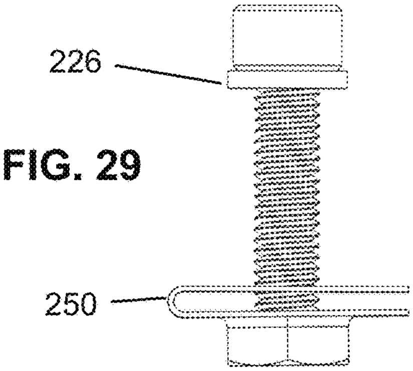
FIG. 29 shows a side view of a fastener and clip nut of the mounting assembly.
Figure 30:
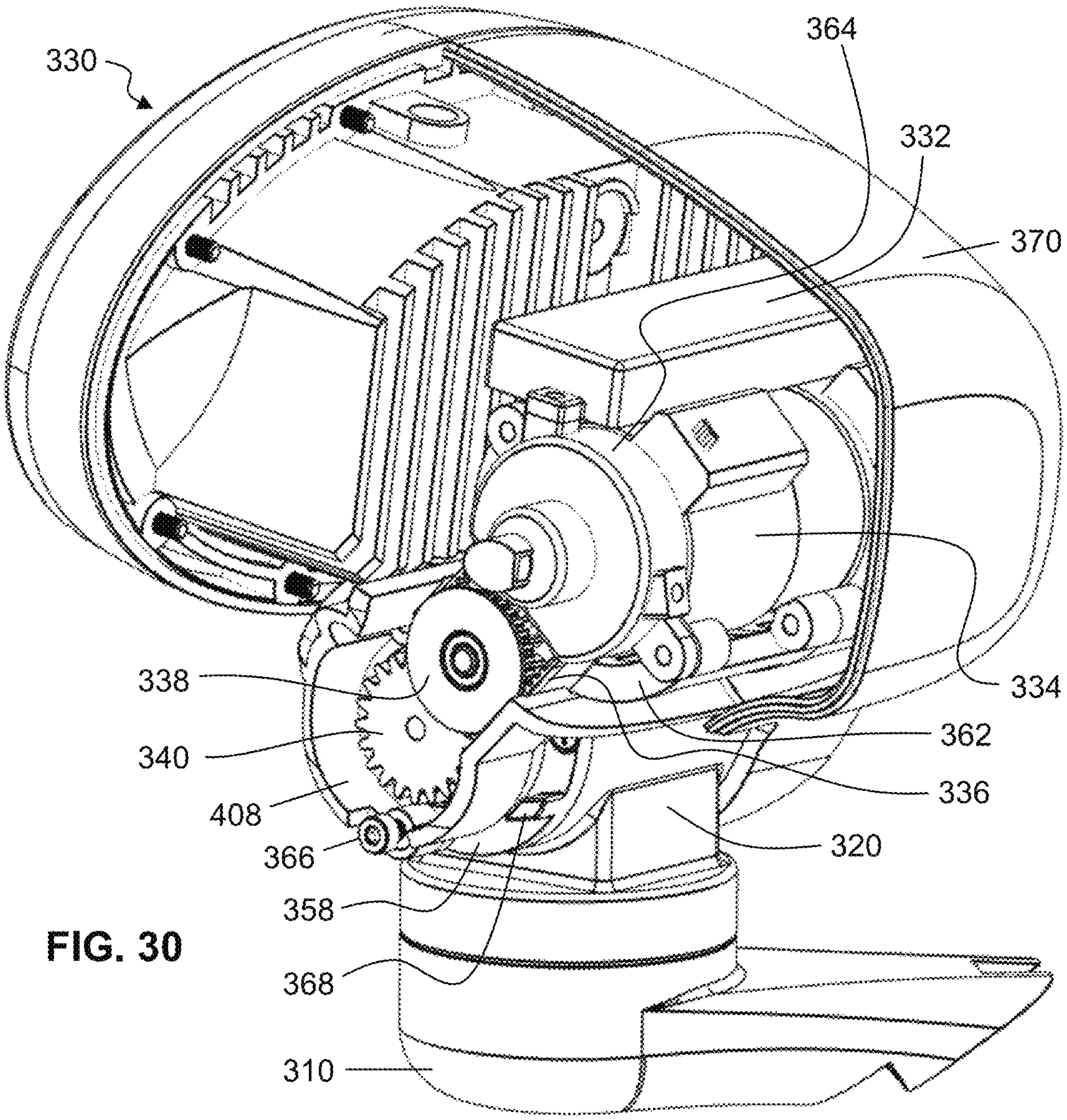
FIG. 30 shows a left side perspective view of the searchlight assembly of FIG. 3 with the left housing shell omitted.
Figure 31:
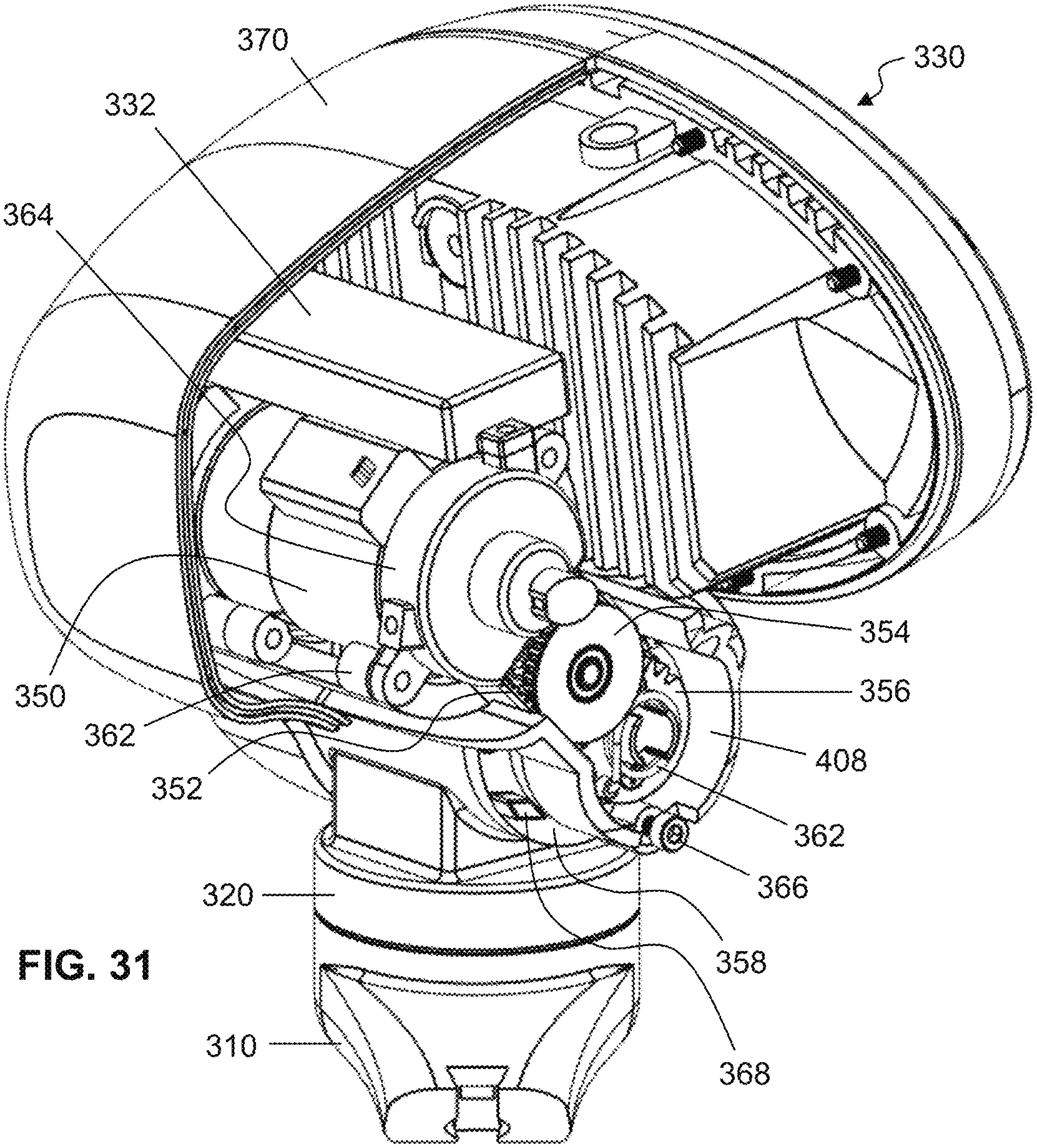
FIG. 31 shows a right side perspective view of the searchlight assembly of FIG. 3 with the right housing shell omitted.
Figure 32:
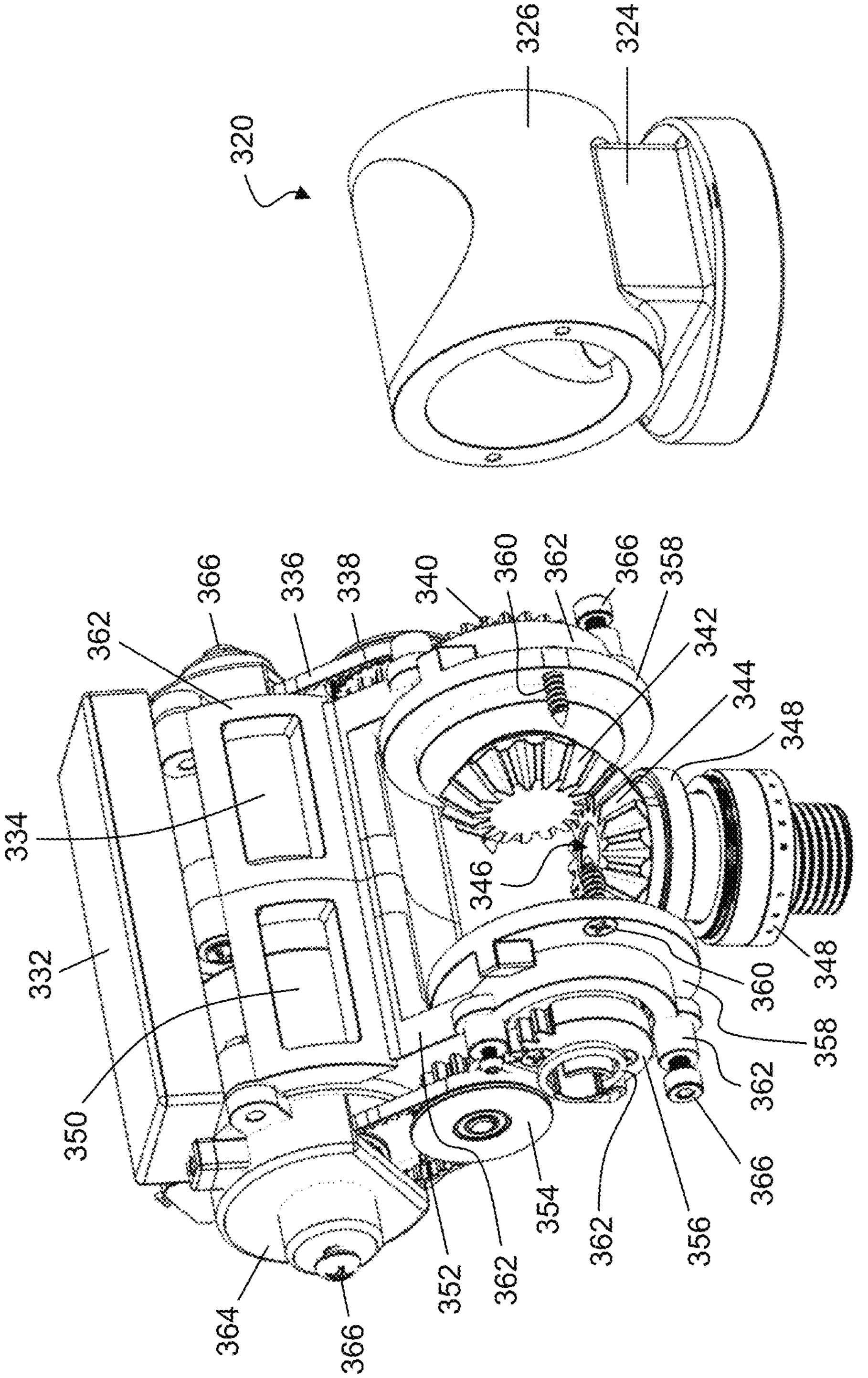
FIG. 32 shows a front perspective view of the pan/tilt drive mechanism components of the searchlight assembly of FIGS. 31 and 32 with the pivot post component moved to the right.
Figure 33:
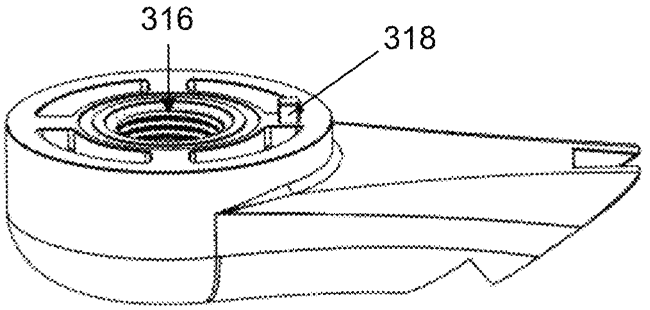
FIG. 33 shows a side perspective view of the support arm of the searchlight assembly of FIGS. 31 and 32.
Figure 34:
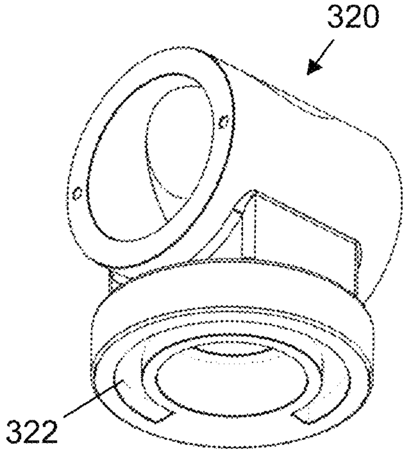
FIG. 34 shows a bottom perspective view of the pivot post component of FIG. 32.

FIGS. 20A and 20B shows another arrangement of the left A-pillar of a vehicle. The vehicle here is a 2020 Ford Explorer. Here, the A-pillar 5 does not comprise mating holes 30. Rather, the base piece 15 is a metal piece welded onto the A-pillar 5. The base piece 15 has openings 35 for attachment of the trim piece 10. The trim cover 10 with the openings 20 introduced for installing a searchlight system according to the present disclosure is shown in FIG. 21. As seen in FIGS. 22 and 23, the rear side of the trim cover 10 has fittings 40 for snap fasteners (not shown) which couple into the openings 35 of the base piece 15. FIGS. 24-26 show another embodiment of a mounting assembly 200 according to the present disclosure for this A-pillar arrangement. The above descriptions regarding the previous embodiment, including the attachment of the mounting assembly 200 and the searchlight assembly 300, apply here unless otherwise specified and are therefore not repeated. This mounting assembly 200 has a one-piece construction, with the bracket 210 and the adapter 230 produced as a single component. In addition to not having a separate bracket piece 212, this mounting assembly 200 also illustrates another possible arrangement of the bracket 210 with adapter 230 with respect to size, extension and positioning. Referring now to FIGS. 27-29, the mounting assembly 200 further comprises clip nuts 250. The clip nuts 250 couple to the fasteners 226. The clip nuts 250 provide the mating or anchoring structure for the fasteners 226, as the pillar 5 does not have the holes 30 to receive the fasteners 226. The clip nuts 250 are provided adjacent the fittings 40 of the trim cover 10. As best seen in FIG. 29, the clip nuts 250 have a bracket or clip integral with the nut head. The clip nuts 250 are mounted in the openings 35 of the base piece 15, with the bracket of the clip nut 250 holding the metal sheet material of the base piece 15. In this way, the clip nuts 250 can be used to secure the mounting assembly 200 with respect to the vehicle pieces 10, 15 and therefore with respect to the pillar 5. The head and shank of the fastener 226 as well as the inclusion of a washer thereon, which is common with these types of fastener arrangements, are also clearly visible in FIG. 29. Of course, clip nuts 250 may be also used in other embodiments of the mounting assembly 200, for example those with the bracket 210 and adapter 230 provided as separate components and/or including multiple brackets 210, 212, as in the previous example of FIGS. 8-13, depending on the pillar mounting configuration.

Referring also now to FIGS. 30-34, the pan/tilt mechanisms of the searchlight assembly 300 are described. A controller 332 is provided within the searchlight head 330 which controls operation of the electronic components, such as the light source and motors, based on user input (e.g. wired or wireless). The internal components are covered, in part, by at least one housing shell 370. The depicted embodiment comprises left and right housing shells 370.

During horizontal pan movement, the pivot post 320 and the head 330 are both rotated relative to the support arm 310.

For the pan mechanism, a first reversible motor 334 drives belt 336, which drives sprocket 338. Sprocket 338 includes another gear face which drives vertical gear 340. Pan gear 340 is in a locked connection with the shaft of miter gear 342, such that rotation of vertical gear 340 causes rotation of miter gear 342. Rotating miter gear 342 acts against fixed miter gear 344. Miter gear 344 is positionally fixed on the support arm 310, thereby causing rotation of the pivot post 320 and head 330 relative to the support arm 310.

In the depicted embodiment, the bottom end of miter gear 344 comprises threading which mates with the opposite end of the internal conduit 316 of the support arm 310 when the miter gear 344 is installed on the support arm 310, although other configurations may also be used. The miter gear 344 has an internal conduit 346 for running wiring through the internal conduit 316 of the support arm 310 up into the pivot post 320. Bearings 348 are provided between the miter gear 344 and the pivot post 320 for rotating the pivot post 320, and therefore also the head 330, relative to the support arm 310. The support arm 310 may further comprise a stop 318, which sits within a stop channel 322 formed on the bottom of the pivot post 320, to limit the degree of horizontal rotation. In the depicted embodiment, the available pan rotation arc is approximately 270°. The available pan rotation arc is preferably configured to prevent the optical device of the searchlight head 330 from being accidentally pointed into the passenger cabin of the automobile, whereby the approximately 90° arc through which the head 330 is unable to rotate corresponds to the facing direction of the optical device with respect to the passenger cabin area. The length and positional arrangement of the stop channel 322 on the pivot post 320 may be selected for a given application, for example, where the searchlight system 100 is to be mounted to the right A-pillar rather than the left A-pillar of the automobile.

During vertical tilt movement, the head 330 is rotated relative to both the pivot post 320 and the support arm 310. For the tilt mechanism, a second reversible motor 350 drives belt 352, which drives sprocket 354. Sprocket 354 includes another gear face which acts against fixed gear 356. Gear 356 is fixed with respect to one of the support plates 358. The support plates 358 are fixed with respect to the pivot post 320 via fasteners 360 in the depicted embodiment. The tilt mechanism may also include a torsion spring 362, which is biased to assist in tilting the head 330 upwards against gravity. A tilt stop 368 is built into one or both support plates 358. The stops 368 limit travel of the cradle 362 during tilt movement, which can be used to prevent over-rotation. The fixed gear 356 and its respective support plate 358 have an internal conduit for running wiring from the pivot post 320 into the interior of the head 330 (e.g. to the controller 332 and/or other electronic components).

A cradle 362 provides a mounting structure for the controller 332, motors 334, 350, and sprockets 338, 354. The cradle 362 is fixed with respect to the housing shell 370, both directly and indirectly through the motor caps 364 via fasteners 366 in the depicted embodiment. Sealed bearings (not shown) are provided between each of the support plates 358 and the cradle 362 for rotating the cradle 362, and therefore the rest of the head 330, relative to the support plates 358, and therefore also the pivot post 320 and support arm 310. On the pan mechanism side, bearings (not shown) are also provided between the respective support plate 358 and both the vertical gear 340 and miter gear 342—which gears 340, 342 rotate together relative to the support plate 358 in acting on the fixed miter gear 344 inside the pivot post 320.

Figure 35:
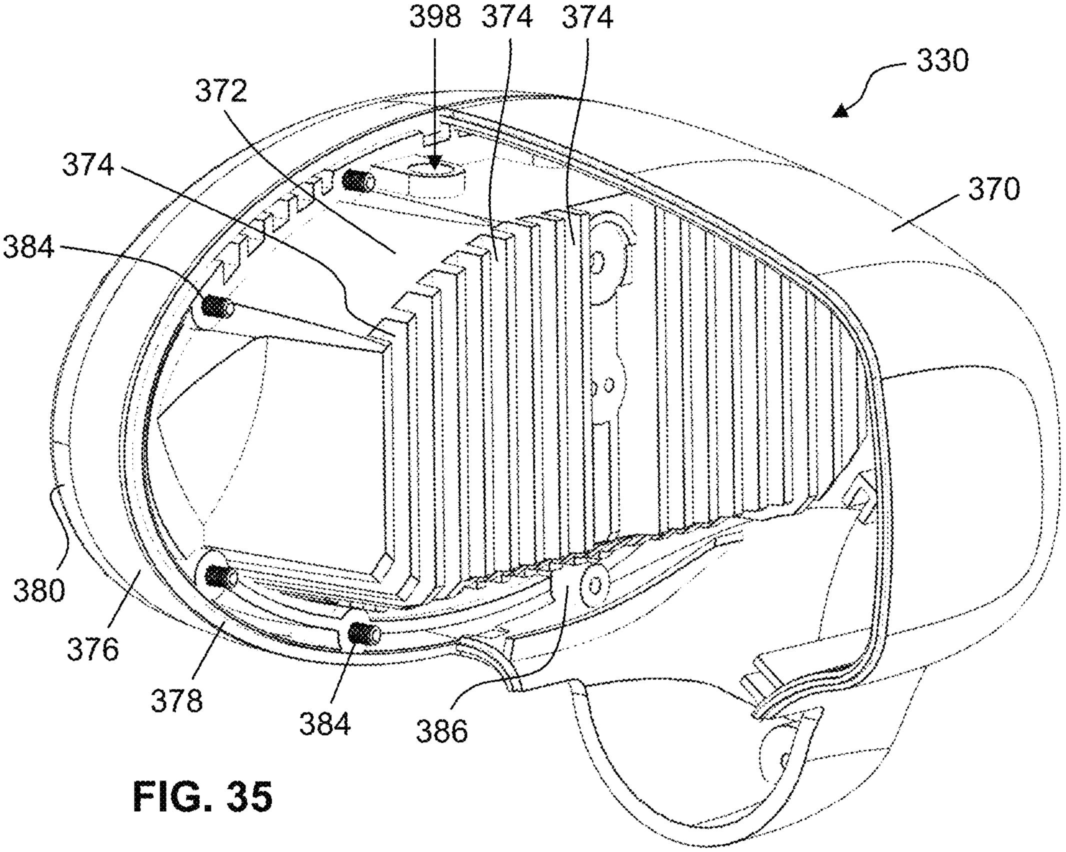
FIG. 35 shows a left side perspective view of the head of the searchlight assembly of FIG. 30 with the left housing shell and pan/tilt drive mechanism components omitted.
Figure 36:
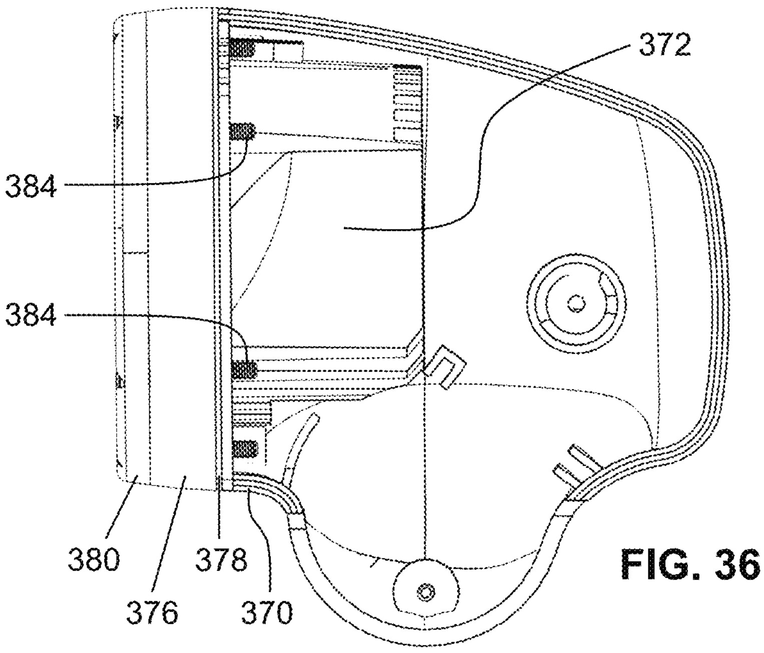
FIG. 36 shows a left side view of the head of FIG. 35.
Figure 37:
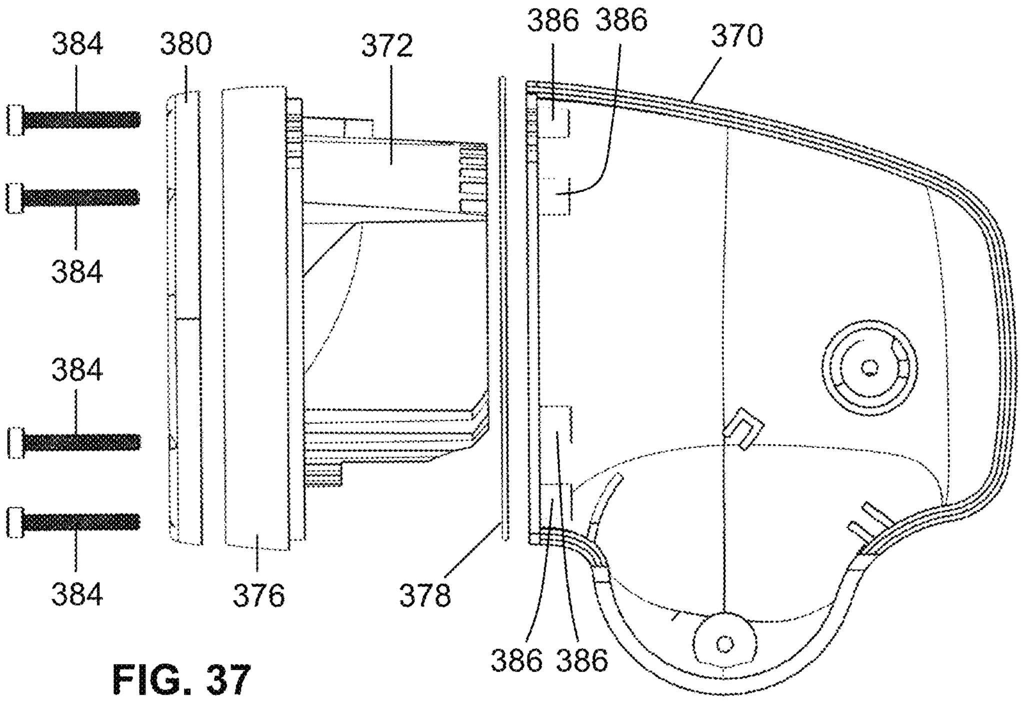
FIG. 37 shows an exploded view of the head of FIG. 36.
Figure 38:
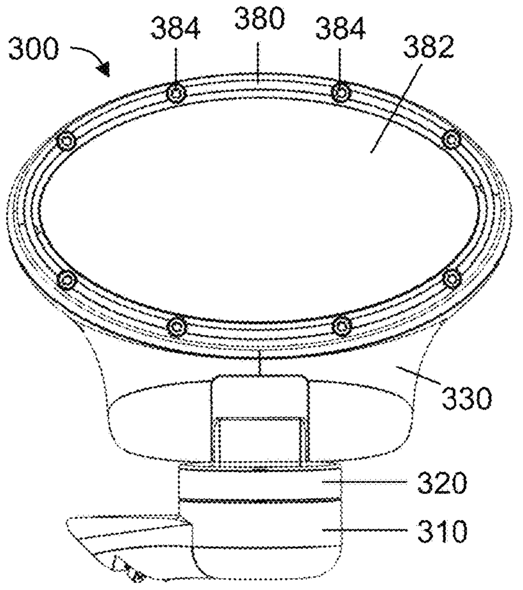
FIG. 38 shows a front side view of the searchlight assembly of FIG. 3.
Figure 39:
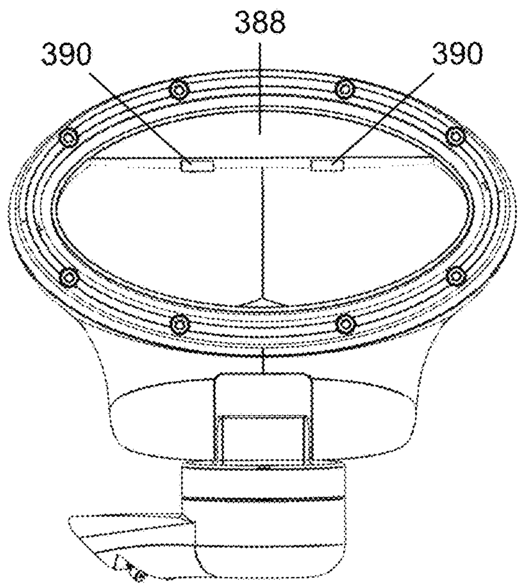
FIG. 39 shows the searchlight assembly of FIG. 38 with the outer lens cover omitted.
Figure 40:
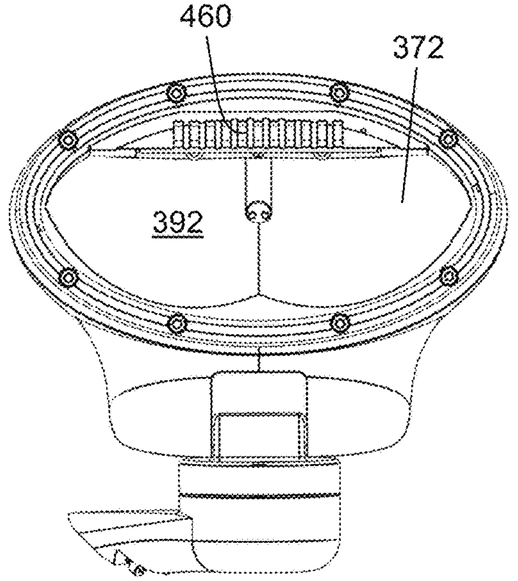
FIG. 40 shows the searchlight assembly of FIG. 39 with the reflector omitted.
Figure 41:
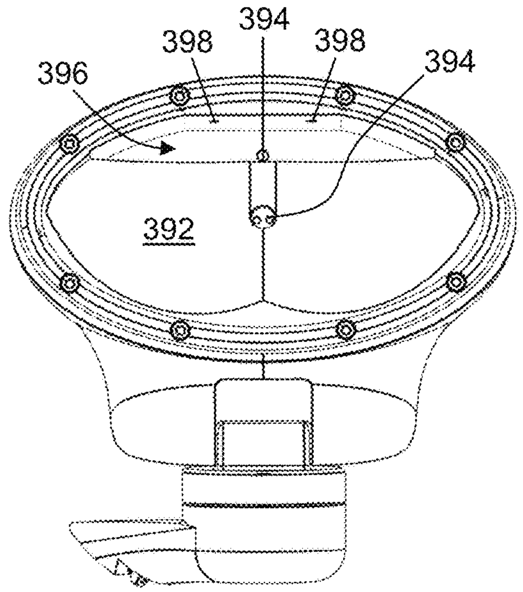
FIG. 41 shows the searchlight assembly of FIG. 40 with the LEDs and LED mounting bracket omitted.

Referring also now to FIGS. 35-37, the head 300 further comprises a heat sink 372. The heat sink 372 is made of a material with good heat-dissipation properties. For example, aluminum or other metals may be used. Those of skill in the art will understand that any material having similar heat-exchange properties could also be used. The heat sink 372 comprises cooling fins 374, which help dissipate heat, and a heat sink ring structure 376. The heat sink ring 376 forms a part of the exterior surface of the head 300 and is therefore exposed to the ambient environment, which promotes substantial heat dissipation between the head 330 and its outside surroundings. In the depicted embodiment, the heat sink ring 376 is integral with the remainder of the heat sink 372; the heat sink 372 with its fins 374 and ring 376 being formed from a single cast. In other embodiments, the heat sink ring 376 may be provided as a separate component which contacts the heat sink 372 to establish thermal communication therebetween, whereby heat from the heat sink 372 is transferred to the heat sink ring 376 and then dissipated to the exterior environment. A ring gasket 378 is provided between the heat sink ring 376 and the housing shells 370, which helps seal against the ingress of water and/or dirt into the interior of the head 300. On its other side, the heat sink ring 376 abuts a bezel 380. The bezel 380 holds the lens cover 382 (see also FIG. 38) in place which in turn supports the optical or sensor device system against the heat sink 372. For illustrative clarity, the lens cover 382 is depicted being opaque; it being understood that the lens cover 382 is transparent or at least partially translucent for purposes of light emission. For attachment, fasteners 384 are inserted through the bezel 380 (which provides the fastener head contact surface), through the heat sink 372 and anchored into bosses 386 of the housing shells 370.

Referring also now to FIGS. 38-41, one possible optical device configuration is described. Although the optical device of the depicted embodiment is an LED lamp, other optical or sensor systems (e.g. halogen or HID lamps, cameras, infrared sensors, heat sensors, etc.) may also be used according to the present disclosure. Indeed, one aspect of the searchlight system 100 is the modular exchange of different searchlight assemblies 300 with respect to an already-installed mounting assembly 200, including for the purpose of switching out different optical or sensor device systems as desired under the circumstances. Further, although the depicted optical device has a reflective design which utilizes a reflective surface to redirect and concentrate light emitted by one or more LEDs into an output beam, other embodiments comprise a refractive design which utilizes at least one projection lens to redirect and concentrate emitted light into an output beam. Some embodiments incorporate both reflective and refractive designs. A searchlight system according to the present disclosure and the various aspects thereof may be used with any suitable optical device system; no limitation is intended nor should be inferred.

In the depicted embodiment, a reflector 388 is provided under the lens cover 382. The surface of the reflector 388 is configured to redirect and concentrate light emitted through LED openings 390 in the reflector 388. The reflector 388 is positioned adjacent a front surface 392 of the heat sink 372 (opposite the fins 374). The geometry of the front surface 392 may correspond to the geometry of the reflector 388, as in the depicted embodiment, which helps to correctly align the reflector 388 between the heat sink 372 and the lens cover 382. The front surface 392 includes apertures 394 for running wiring to the controller 332 within the head 330. The front surface 392 also has a cavity 396 which receives a LED mounting bracket 400. Bores 398 (see also FIG. 35) are provided in the upper portion of the cavity 396 to receive fasteners (not shown) for coupling the heat sink 472 to the mounting bracket 400.

Figure 42:
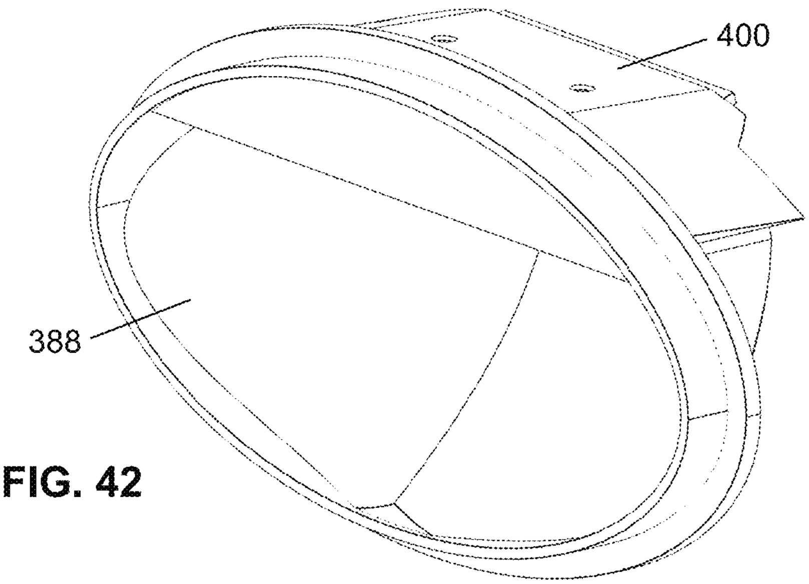
FIG. 42 shows a front perspective view of the reflector and LED mounting bracket of FIGS. 39 and 40.
Figure 43:
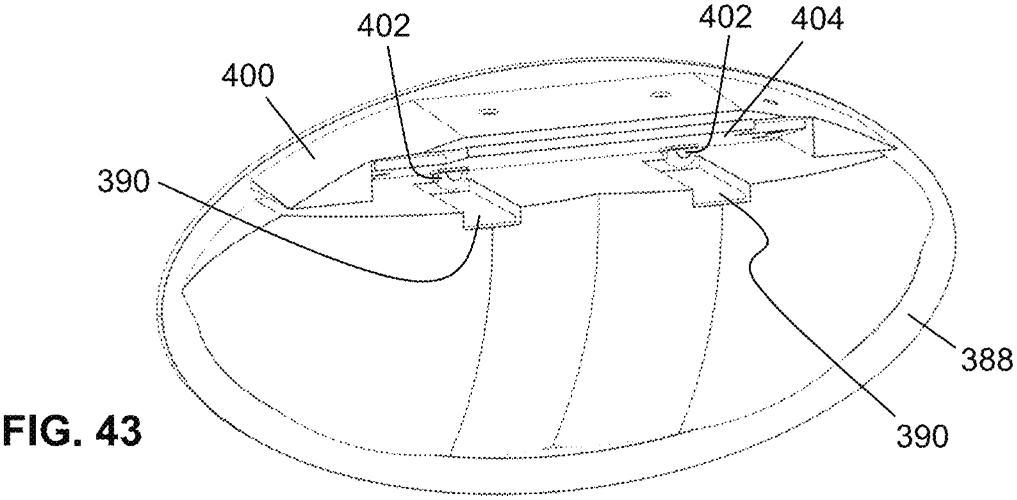
FIG. 43 shows a rear perspective view of the reflector and LED mounting bracket of FIG. 42 with LED circuit board and LEDs mounted to the mounting bracket.
Figure 44:
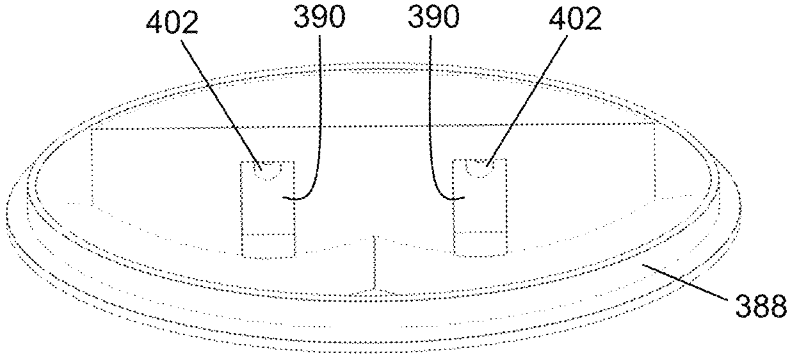
FIG. 44 shows a bottom front perspective view of the reflector and LED mounting bracket of FIG. 42.

Referring also now to FIGS. 42-44, the LED mounting bracket 400 is arranged within the cavity 396 between the reflector 388 and the heat sink 372. The top surface of the mounting bracket 400 has anchor holes for mating with fasteners (not shown) which extend through the heat sink bores 398 in coupling the bracket 400 to the heat sink 372. LEDs 402 are provided on circuit board 404, which is mounted to the mounting bracket 400. The LEDs 402 are positioned to emit light through the reflector openings 390 onto the surface of the reflector 388, which may be configured to redirect and concentrate the light into a beam as in the depicted embodiment. In other embodiments, one or more LEDs 402 are positioned along the front surface 392 of the heat sink 372, and at least one projection lens (not shown) is arranged between the LEDs 402 and the lens cover 382, the at least one projection lens configured to redirect and concentrate light into a beam, in which case the front surface 392 of the heat sink 372 may be flat or take on different shapes and the reflector 388 omitted entirely.

Reference is also now made to FIGS. 45 and 46. In the tilt mechanism described above, the head 330 (including housing shells 370) rotates relative to both the stationary pivot post 320 and fixed support plates 358. Therefore, at least some clearance space is provided between a lower edge 406 of each housing shell 370 and the pivot post's neck 324 and body 326 (see FIG. 34) and the support plates 358 to accommodate this motion. However, water, dust and the like could potentially enter through such clearance space into the interior of the head 330 and negatively affect mechanical or electronic components. To mitigate against this problem, a special insert piece 408 is provided for each housing shell 370. Together with the housing shells 370 and cradles 362, the insert pieces 408 seal the area of the head 330 occupied by the pivot post 320 and support plates 358 from the rest of the interior of the head 330 containing parts that might be negatively affected by moisture/particle ingress. The internal surface 410 of each housing shell 370 comprises fitting projections 412 for positioning the insert piece 408 thereon. Sealant or adhesive is provided along the contact points between each housing shell 370 and its respective insert piece 408. In other embodiments (not shown), one or more rubber, elastomer or like seals may be provided along these contacts points. On the opposite interior-facing end of each insert piece 406, one or more rubber, elastomer or like seals 414 is/are provided along the contact points with the other insert piece 408 and the cradle 362. Since the geometry provided by the special insert pieces 408 is not integrated into the housing shells 370 themselves, the housing shells 370 may be readily produced by efficient processes such as injection molding.

While a number of aspects and embodiments have been discussed, those of skill in the art will recognize certain modifications, permutations, additions and sub-combinations are possible. It is intended that the following claims are interpreted to include all such modifications, permutations, additions and sub-combinations, as they are within the true spirit and scope of the present disclosure and the claims. Each embodiment described herein has numerous equivalents.

The terms and expressions which have been employed are used as terms of description and not of limitation, and there is no intention in the use of such terms and expressions to exclude any equivalents of the features shown and described or portions thereof, but it is recognized that various modifications are possible within the scope of the invention claimed. Accordingly, it should be understood that although the invention has been specifically disclosed by selected embodiments and optional features, modification and variation of the concepts herein disclosed may be resorted to by those skilled in the art, and that such modifications and variations are considered to be within the scope of this invention as defined by the appended claims. Whenever a range is given in the specification, all intermediate ranges and subranges, as well as all individual values included in the ranges given are intended to be included in the disclosure. When a Markush group or other grouping is used herein, all individual members of the group and all combinations and sub-combinations possible of the group are intended to be individually included in the disclosure.

In general, the terms and phrases used herein have their art-recognized meaning, which can be found by reference to standard texts, journal references and contexts known to those skilled in the art. The above definitions are provided to clarify their specific use in the context of the invention.

LIST OF REFERENCE NUMERALS

5 A-pillar
10 trim cover
15 base trim piece or tracking
20 cover openings
25 fasteners
30 A-pillar mating holes
35 base piece openings
40 trim cover fittings
100 mounted searchlight system
200 mounting assembly
210 upper bracket
212 lower bracket
214 interior bracket surface
216 exterior bracket surface
218 projection
220 bore
222 end wall
224 bore
226 fastener
230 adapter
232 adapter mounting collar
234 bracket opening
236 bracket interface surface
238 fasteners
240 first adapter projection
242 second adapter projection
244 fasteners
246 adapter internal conduit
248 adapter collar conduit
250 clip nuts
300 searchlight assembly
310 support arm
312 projections
314 fastener mating bores
316 arm internal conduit
317 arm external aperture
318 pan stop
320 pivot post
322 stop channel
324 pivot post neck
326 pivot post body
330 head
332 electronics controller

334 pan reversible motor
336 pan belt
338 pan sprocket
340 pan gear
342 pan rotating miter gear
344 pan fixed miter gear
346 miter gear conduit
348 post bearings
350 tilt reversible motor
352 tilt belt
354 tilt sprocket
356 tilt fixed gear
358 support plates
360 fasteners
362 cradle
364 motor caps
366 fasteners
368 tilt stop
370 housing shell
372 heat sink
374 cooling fins
376 heat sink ring
378 heat sink ring gasket
380 bezel
382 lens cover
384 fasteners
386 housing bosses
388 reflector
390 LED reflector openings
392 front surface of heat sink
394 heat sink apertures
396 heat sink cavity
398 heat sink bores
400 LED mounting bracket
402 LEDs
404 LED circuit board
406 housing edge
408 insert piece
410 internal housing surface
412 insert piece fittings
414 seals

The invention claimed is:

1. A searchlight mounting system for a vehicle, comprising:

a mounting assembly including a bracket and an adapter, the bracket configured to be mounted on a vehicle surface, and the adapter configured to attach a searchlight assembly thereon, wherein the bracket has an interior surface configured to face toward the vehicle surface and an exterior surface opposite the interior surface, and the adapter projects outward from the exterior surface of the bracket, wherein the adapter comprises a first projection and a second projection for attaching the searchlight assembly, the first projection and the second projection being arranged opposite the bracket and spaced apart from one another, wherein at least a portion of the first projection has a cross-sectional geometry which widens as the first projection extends in a direction away from the bracket.

2. The searchlight mounting system of claim 1, wherein the bracket comprises projections extending out from the interior surface, with a first bore formed into each projection from the exterior surface, wherein each projection has an end wall opposite the interior surface with a second bore formed through the end wall, with the first bore being larger in diameter than the second bore, and further comprising fasteners having a head and a shank which insert into the projections, the head being larger in diameter than the second bore, and the shank being smaller in diameter than the second bore.

3. The searchlight mounting system of claim 1, wherein the adapter has an internal conduit extending therethrough for running wiring for the searchlight assembly.

4. The searchlight mounting system of claim 3, wherein the bracket has a shell construction with the interior surface defining a cavity formed by the shell construction.

5. The searchlight mounting system of claim 4, wherein one side of the internal conduit through the adapter is positioned between the first projection and the second projection, with another side of the internal conduit facing the cavity defined by the interior surface of the bracket.

6. The searchlight mounting system of claim 1, wherein the bracket is configured to mount to an A-pillar and extend to a windshield cowling area of the vehicle.

7. The searchlight mounting system of claim 1, wherein the bracket and the adapter are formed together as a single component.

8. The searchlight mounting system of claim 1, wherein the adapter is a separate component fixed to the bracket.

9. The searchlight mounting system of claim 8, wherein the interior surface of the bracket comprises an interface surface adjacent a bracket opening through the bracket, the adapter comprises a mounting collar with a wider geometry than the bracket opening, and the adapter extends through the bracket opening in projecting out from the exterior surface of the bracket, with the mounting collar and interface surface abutting one another.

10. The searchlight mounting system of claim 9, wherein a collar conduit is formed in the mounting collar and/or the interface surface for running wiring therethrough.

11. The searchlight mounting system of claim 1, wherein the bracket has a multi-piece construction.

12. The searchlight mounting system of claim 1, wherein the cross-sectional geometry of the first projection of the adapter is trapezoidal in shape.

13. The searchlight mounting system of claim 1, wherein when the mounting assembly is mounted to the vehicle, the first projection of the adapter is positioned vertically higher than the second projection of the adapter.

14. The searchlight mounting system of claim 1, further comprising the searchlight assembly, wherein the searchlight assembly comprises a support arm configured to attach to the adapter of the mounting assembly, and the support arm has, at one end thereof, two projections spaced apart from one another forming a channel therebetween shaped to receive the first projection of the adapter in an interlocking manner, with at least a portion of the channel having a complimentary cross-sectional geometry which widens as the two projections extend away from the support arm.

15. The searchlight mounting system of claim 14, wherein the cross-sectional geometry of the first projection of the adapter is trapezoidal in shape, and facing walls of the two projections of the support arm are angled inward toward one another in extending away from the support arm to compliment the trapezoidal shape of the first projection of the adapter.

16. The searchlight mounting system of claim 14, wherein the first projection of the adapter and the two projections of the support arm interface to form a dovetail joint.

17. The searchlight mounting system of claim 14, wherein when the support arm is mounted on the adapter, the first projection of the adapter is inserted into the channel between the two projections of the adapter, with the two projections of the support arm abutting the second projection of the adapter.

18. The searchlight mounting system of claim 17, wherein when the mounting assembly is mounted to the vehicle, the first projection of the adapter is positioned vertically higher than the second projection of the adapter, such that the searchlight assembly is downwardly slidable onto the adapter of the mounting assembly, with the two projections of the support arm supported on the second projection of the adapter when the support arm is mounted on the adapter.

19. The searchlight mounting system of claim 17, wherein the second projection of the adapter comprises two bores configured to receive fasteners, and when the support arm is mounted on the adapter, each bore of the second projection is aligned with a respective fastener mating bore formed in each of the two projections of the support arm.

20. The searchlight mounting system of claim 14, wherein the support arm comprises an internal conduit which, when the support arm is mounted on the adapter, aligns with an internal conduit of the adapter for running wiring there-through.

21. The searchlight mounting system of claim 14, wherein the searchlight assembly further comprises a pivot post rotatably mounted to the support arm for pan motion, and a head rotatably mounted to the pivot post for tilt motion, the head comprising an optical device.

22. The searchlight mounting system of claim 21, wherein the optical device is an LED lamp, halogen lamp, HID lamp, camera, infrared sensor, or heat sensor.

* * * * *